(12) United States Patent
Yin et al.

(10) Patent No.: US 10,428,924 B2
(45) Date of Patent: Oct. 1, 2019

(54) TURBINE ASSEMBLY FOR HYDROKINETIC TORQUE CONVERTER, AND METHOD FOR MAKING THE SAME

(71) Applicant: VALEO EMBRAYAGES, Amiens (FR)

(72) Inventors: Xuexian Yin, Troy, MI (US);
Alexandre Depraete, Bloomfield, MI (US)

(73) Assignee: Valeo Embrayages, Amiens (FR)

( * ) Notice: Subject to any disclaimer, the term of this patent is extended or adjusted under 35 U.S.C. 154(b) by 266 days.

(21) Appl. No.: 15/354,777

(22) Filed: Nov. 17, 2016

(65) Prior Publication Data
US 2018/0135737 A1    May 17, 2018

(51) Int. Cl.
*F16H 45/02* (2006.01)
*F16H 41/24* (2006.01)
*F16H 41/28* (2006.01)

(52) U.S. Cl.
CPC ............. *F16H 45/02* (2013.01); *F16H 41/24* (2013.01); *F16H 41/28* (2013.01); *F16H 2045/0231* (2013.01); *F16H 2045/0278* (2013.01)

(58) Field of Classification Search
CPC .. F16H 45/02; F16H 41/24; F16H 2045/0278; F16H 2045/0231; F16H 45/00–2045/0294; F16H 41/00–41/28
See application file for complete search history.

(56) References Cited

U.S. PATENT DOCUMENTS

| | | | |
|---|---|---|---|
| 2,749,710 A | 6/1956 | Russell | |
| 2,762,197 A | 9/1956 | Ullery | |
| 5,465,575 A * | 11/1995 | Shimmell | F16H 41/28 29/889.5 |
| 5,505,590 A * | 4/1996 | Dohring | F16H 41/28 416/180 |
| 6,296,445 B1 | 10/2001 | Chasseguet et al. | |
| 6,378,676 B1 | 4/2002 | Chasseguet et al. | |
| 6,428,276 B1 * | 8/2002 | Chasseguet | F16H 41/28 416/180 |
| 8,162,612 B2 * | 4/2012 | Brees | B23K 1/0008 416/197 C |

* cited by examiner

*Primary Examiner* — Jacob S. Scott
*Assistant Examiner* — Lillian T Nguyen
(74) *Attorney, Agent, or Firm* — Berenato & White, LLC

(57) ABSTRACT

A turbine assembly for a hydrokinetic torque converter. The turbine assembly is rotatable about a rotational axis and comprises a first turbine component coaxial with the rotational axis, a second turbine component formed separately from and non-moveably secured to the first turbine component coaxially therewith, and a plurality of grommets. The first turbine component has a plurality of first turbine blade members integrally formed therewith. One of the first and second turbine components has a substantially annular mounting portion provided with a plurality of mounting holes. Each of the grommets is mounted in one of the mounting holes through the mounting portion.

15 Claims, 34 Drawing Sheets

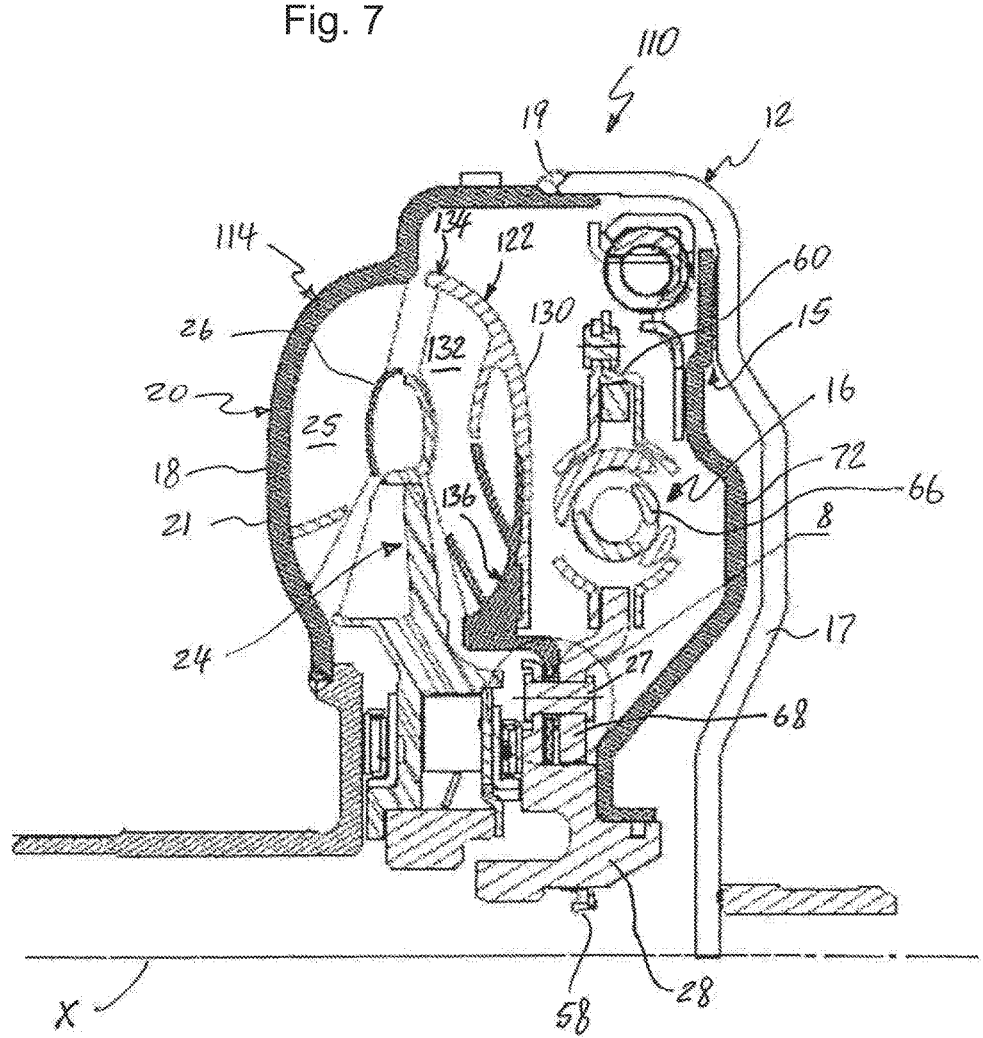

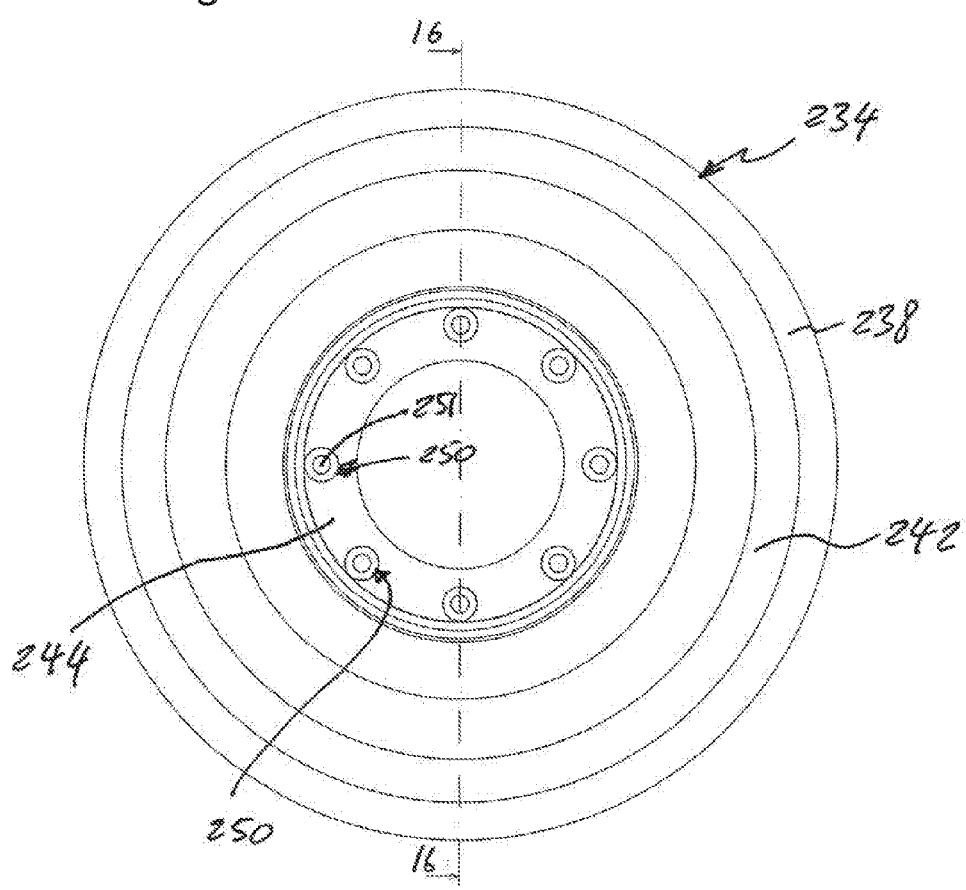

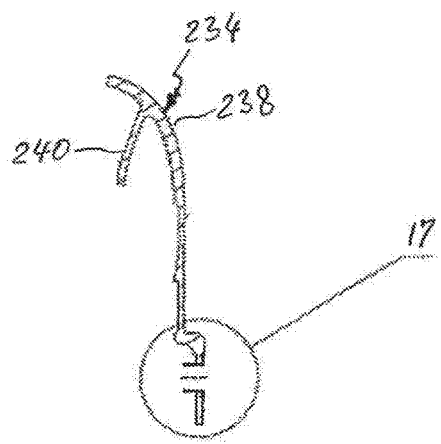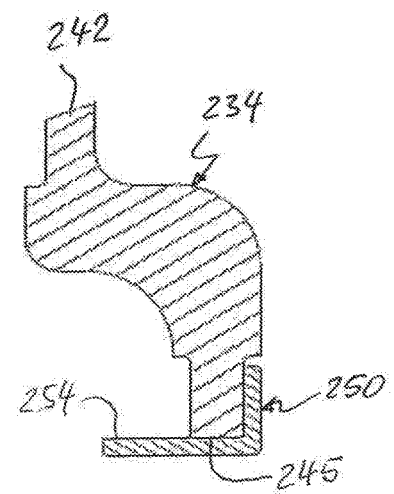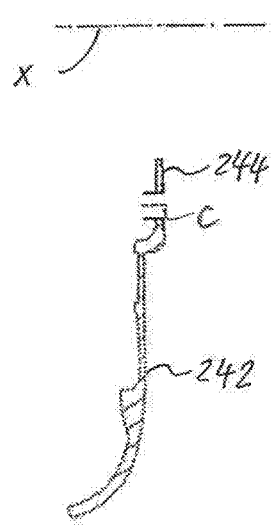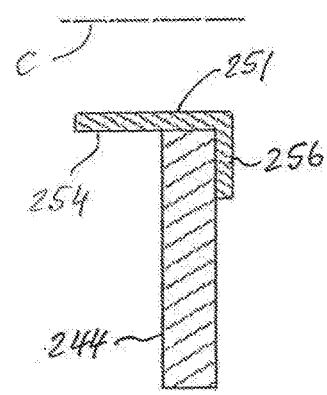
Fig. 16
Fig. 17

TURBINE ASSEMBLY FOR HYDROKINETIC TORQUE CONVERTER, AND METHOD FOR MAKING THE SAME

BACKGROUND OF THE INVENTION

1. Field of the Invention

The present invention generally relates to fluid coupling devices, and more particularly to a turbine assembly for hydrokinetic torque converters, and a method for making the same.

2. Background of the Invention

Typically, a hydrokinetic torque converter includes an impeller assembly, a turbine assembly, a stator (or reactor) fixed to a casing of the torque converter, and a one-way clutch for restricting rotational direction of the stator to one direction. The turbine assembly is integrally or operatively connected with a hub that is linked in rotation to a driven shaft, which is itself linked to an input shaft of a transmission of a vehicle. The casing of the torque converter generally includes a front cover and an impeller shell, which together define a fluid filled chamber. Impeller blades are fixed to an impeller shell within the fluid filled chamber to define the impeller assembly. The turbine assembly and the stator are also disposed within the chamber, with both the turbine assembly and the stator being relatively rotatable with respect to the front cover and the impeller shell. The turbine assembly includes a turbine shell with a plurality of turbine blades fixed to one side of the turbine shell facing the impeller blades of the impeller.

The turbine assembly works together with the impeller assembly, which is linked in rotation to the casing that is itself linked in rotation to a driving shaft driven by an internal combustion engine. The stator is interposed axially between the turbine assembly and the impeller assembly, and is mounted so as to rotate on the driven shaft through the interposition of the one-way clutch.

Conventionally, the turbine shell and the turbine blades are usually formed separately by stamping from steel blanks. The turbine shell is typically slotted to receive, through the slots, tabs formed on the turbine blades. After the turbine blades are located within the turbine shell, the tabs are bent or rolled over to form a mechanical attachment on the turbine shell that holds the turbine blades fixed in position.

Current hydrokinetic torque converters and methods for assembly thereof are quite complex, cumbersome and expensive. Therefore, while conventional hydrokinetic torque converters, including but not limited to those discussed above, have proven to be acceptable for vehicular driveline applications and conditions, improvements that may enhance their performance and cost are possible.

BRIEF SUMMARY OF THE INVENTION

According to a first aspect of the invention, there is provided a turbine assembly for a hydrokinetic torque converter. The turbine assembly is rotatable about a rotational axis and comprises a first turbine component coaxial with the rotational axis, a second turbine component formed separately from and non-moveably secured to the first turbine component coaxially therewith, and a plurality of grommets. The first turbine component has a plurality of first turbine blade members integrally formed therewith. One of the first and second turbine components has a substantially annular mounting portion provided with a plurality of mounting holes. A grommet is mounted in each of the mounting holes through the mounting portion.

According to a second aspect of the present invention, there is provided a hydrokinetic torque-coupling device comprising an impeller assembly rotatable about a rotational axis, a turbine assembly rotatable about the rotational axis and disposed axially opposite to the impeller assembly, a turbine hub non-moveably secured to the turbine assembly, and fasteners non-moveably securing the turbine hub to the turbine assembly. The turbine assembly is coaxially aligned with and hydro-dynamically drivable by the impeller assembly. The turbine assembly comprises a first turbine component coaxial with the rotational axis and having a plurality of first turbine blade members integrally formed therewith, a second turbine component formed separately from and non-moveably secured to the first turbine component coaxially therewith, and grommets. One of the first and second turbine components has a substantially annular mounting portion provided with a plurality of mounting holes. One of the grommets is mounted in each of the mounting holes through the mounting portion. Each of the fasteners extends through an associated one of the grommets so as to non-moveably secure the turbine hub to the turbine assembly.

According to a third aspect of the present invention, there is provided a method for making a turbine assembly of a hydrokinetic torque converter. The method involves the steps of providing a plurality of grommets, making a first turbine component by molding, and making a second turbine component by molding. The first turbine component is made with a plurality of first turbine blade members integrally formed therewith. The second turbine component is made separately from the first turbine component. One of the first and second turbine components is made with a substantially annular mounting portion provided with a plurality of mounting holes. The method further involves the steps of mounting one of the grommets in each of the mounting holes in the mounting portion, and thereby non-moveably securing the first turbine component to the second turbine component.

According to a fourth aspect of the present invention, there is provided a method for making a hydrokinetic torque-coupling device. The method involves the steps of providing an impeller assembly, providing a plurality of grommets, making a first turbine component having a plurality of first turbine blade members integrally formed therewith by molding, and making a second turbine component made separately from the first turbine component by molding. One of the first and second turbine components is made with a substantially annular mounting portion provided with a plurality of mounting holes. The method further involves the steps of mounting one of the grommets in each of the mounting holes in the mounting portion, non-moveably securing the first turbine component to the second turbine component, providing a turbine hub and a plurality of fasteners, and non-moveably securing the mounting portion of the turbine assembly to the turbine hub by the fasteners, so that each of the fasteners extends through one of the grommets and thereby non-moveably secures the turbine hub to the turbine assembly.

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIG. 7 is a fragmented half-view in axial section of a torque-coupling device with a turbine assembly in accordance with a second exemplary embodiment of the present invention;

FIG. 15D is a rear elevational view of the first turbine component of the turbine assembly in accordance with the third exemplary embodiment of the present invention;

FIG. 16 is a partial sectional view of the first turbine component of the turbine assembly taken along the line 16-16 in FIG. 15D;

FIG. 17 is an enlarged view of a fragment of the first turbine component of the turbine assembly shown in the circle "17" of FIG. 16;

Figure 1:
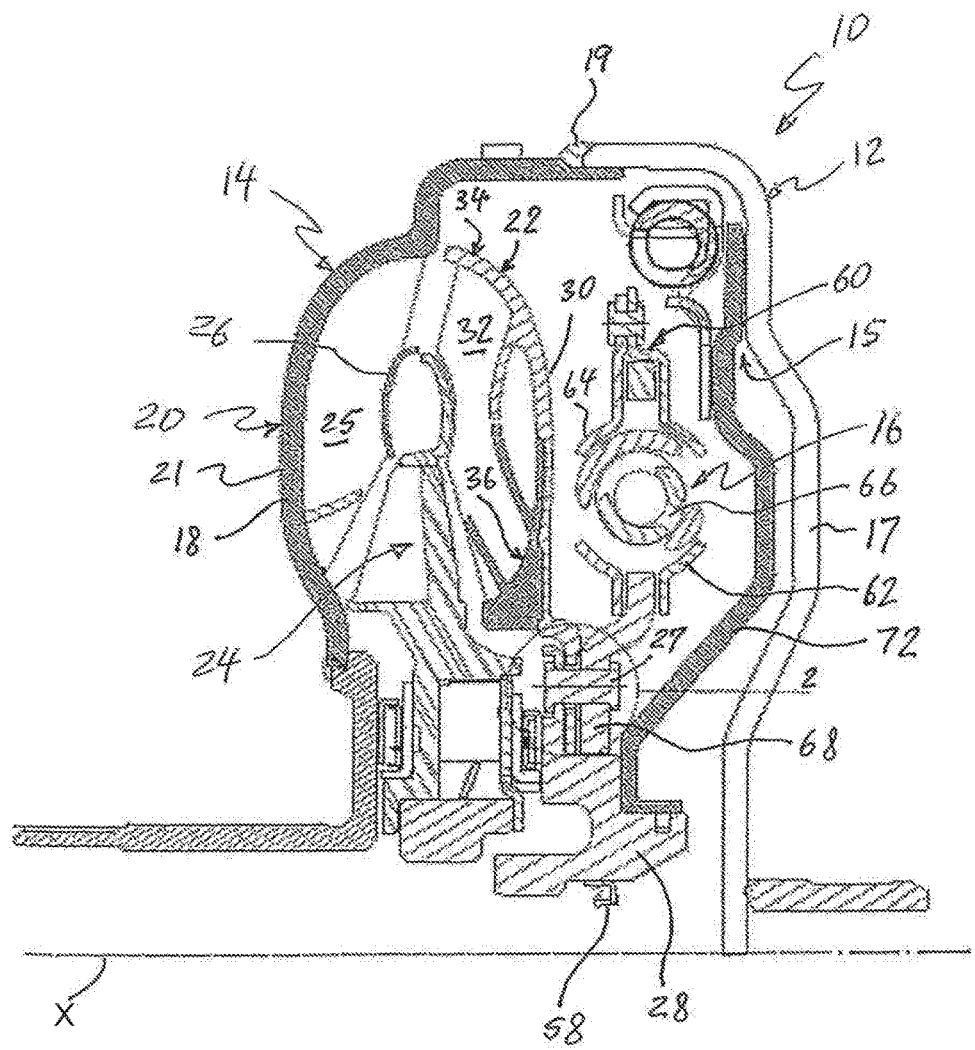
FIG. 1 is a fragmented half-view in axial section of a hydrokinetic torque-coupling device with a turbine assembly in accordance with a first exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" and "an" as used in the claims means "at least one" and the word "two" as used in the claims means "at least two".

A first exemplary embodiment of a hydrokinetic torque coupling device is generally represented in FIG. 1 by reference numeral 10. The hydrokinetic torque coupling device 10 is intended to couple driving and driven shafts, for example of a motor vehicle. In this case, the driving shaft is an output shaft of an internal combustion engine (not shown) of the motor vehicle and the driven shaft is connected to an automatic transmission (not shown) of the motor vehicle.

The hydrokinetic torque coupling device 10 comprises a sealed casing 12 filled with a fluid, such as oil or transmission fluid, and rotatable about a rotational axis X, a hydrokinetic torque converter 14 disposed in the casing 12, a lock-up clutch 15 and a torsional vibration damper (also referred to herein as a damper assembly) 16 also disposed in the casing 12. The torsional vibration damper assembly 16 is mounted to the torque converter 14. The sealed casing 12, the torque converter 14, the lock-up clutch 15 and the torsional vibration damper 16 are all rotatable about the rotational axis X. The drawings discussed herein show half-views, that is, a cross-section of the portion or fragment of the hydrokinetic torque coupling device 10 above the rotational axis X. As is known in the art, the device 10 is symmetrical about the rotational axis X. Hereinafter the axial and radial orientations are considered with respect to the rotational axis X of the torque coupling device 10. Relative terms such as "axially," "radially," and "circumferentially" are with respect to orientations parallel to, perpendicular to, and circularly around the rotational axis X, respectively.

The sealed casing 12 according to the first exemplary embodiment as illustrated in FIG. 1 includes a first casing shell 17, and a second casing shell 18 disposed coaxially with and axially opposite to the first casing shell 17. The first and second casing shells 17, 18 are non-movably (i.e., fixedly) interconnected and sealed together about their outer peripheries, such as by weld 19. The second casing shell 18 is non-movably (i.e., fixedly) connected to the driving shaft, more typically to a flywheel (not shown) that is non-rotatably fixed to the driving shaft, so that the casing 12 turns at the same speed at which the engine operates for transmitting torque. Specifically, in the illustrated embodiment of FIG. 1 the casing 12 is rotatably driven by the internal combustion engine and is non-rotatably coupled to the flywheel thereof, such as with studs (not shown). Typically, the studs are fixedly secured, such as by welding, to the first casing shell 17. Each of the first and second casing shells 17, 18 is integral or one-piece and may be made, for example, by press-forming one-piece metal sheets.

Figure 3:
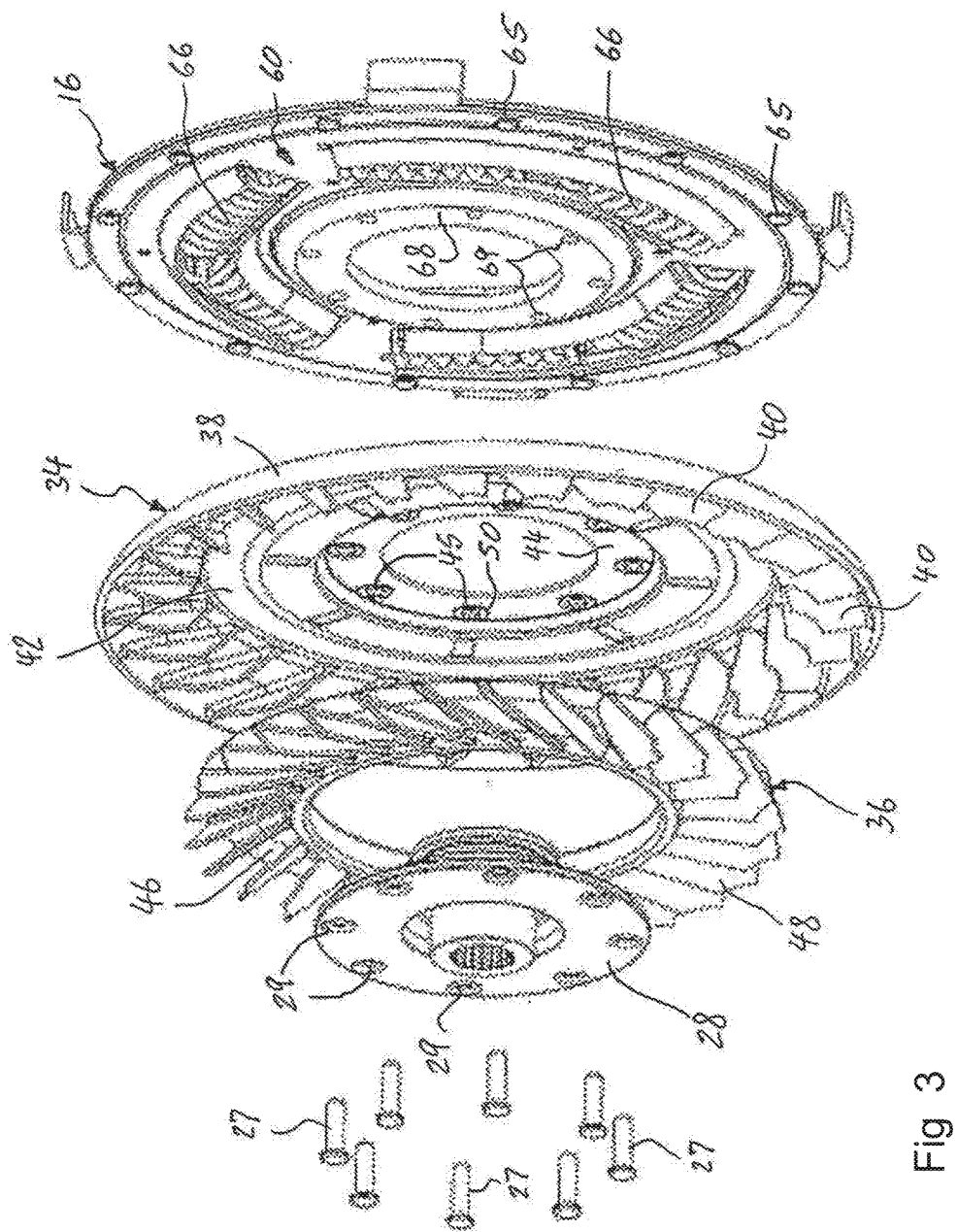
FIG. 3 is a front partial exploded perspective view of a turbine hub, a damper assembly and the turbine assembly in accordance with the first exemplary embodiment of the present invention.

The torque converter 14 comprises an impeller assembly (sometimes referred to as the pump or impeller wheel) 20, a turbine assembly (sometimes referred to as the turbine wheel) 22, and a stator assembly (sometimes referred to as the reactor) 24 interposed axially between the impeller assembly 20 and the turbine assembly 22. The impeller assembly 20, the turbine assembly 22, and the stator assembly 24 are coaxially aligned with one another and the rotational axis X. The impeller assembly 20, the turbine assembly 22, and the stator assembly 24 collectively form a torus. The impeller assembly 20 and the turbine assembly 22 may be fluidly coupled to one another in operation as is known in the art. The torque coupling device 10 also includes a substantially annular turbine (or output) hub 28 (as best shown in FIGS. 1 and 3) rotatable about the rotational axis X, which is arranged to non-rotatably couple together the driven shaft and the turbine assembly 22. A sealing member 58, mounted to a radially inner peripheral surface of the turbine hub 28, creates a seal at the interface of the transmission input shaft and the turbine hub 28.

The impeller assembly 20 includes a substantially annular, semi-toroidal (or concave) impeller shell 21, a substantially annular impeller core ring 26, and a plurality of impeller blades 25 fixedly (i.e., non-moveably) attached, such as by brazing, to the impeller shell 21 and the impeller core ring 26. Thus, a portion of the second casing shell 18 of the casing 12 also forms and serves as the impeller shell 21 of the impeller assembly 20. Accordingly, the impeller shell 21 sometimes is referred to as part of the casing 12. The impeller assembly 20, including the impeller shell 21, the impeller core ring 26 and the impeller blades 25, is non-rotatably secured to the first casing shell 18 and hence to the drive shaft (or flywheel) of the engine to rotate at the same speed as the engine output. The impeller shell 21 and the impeller blades 25 are conventionally formed by stamping from steel blanks.

The turbine assembly 22, as best shown in FIGS. 1 and 3-5, comprises a substantially annular, semi-toroidal (or concave) turbine shell 30 rotatable about the rotational axis X, and a plurality of turbine blades 32 fixedly (i.e., non-moveably) secured to the turbine shell 30 and outwardly extending from the turbine shell 30 so as to face the impeller blades 25 of the impeller assembly 20. The turbine shell 30 of the turbine assembly 22 is non-movably (i.e., fixedly) secured to the turbine hub 28 by appropriate means, such as by rivets 27 or threaded fasteners.

Figure 2:
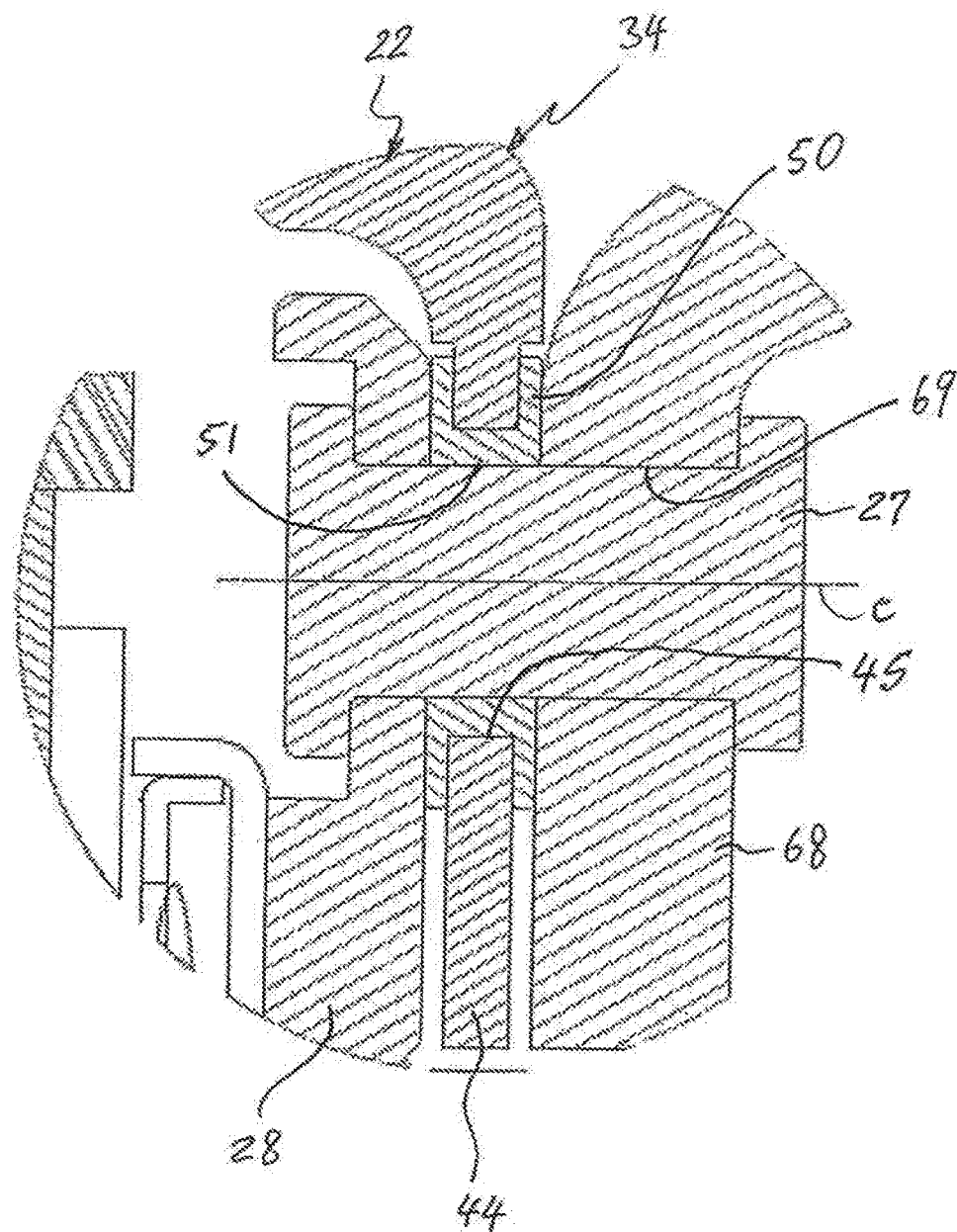
FIG. 2 is an enlarged view of a fragment of the hydrokinetic torque-coupling device shown in the circle "2" of FIG. 1.
Figure 4:
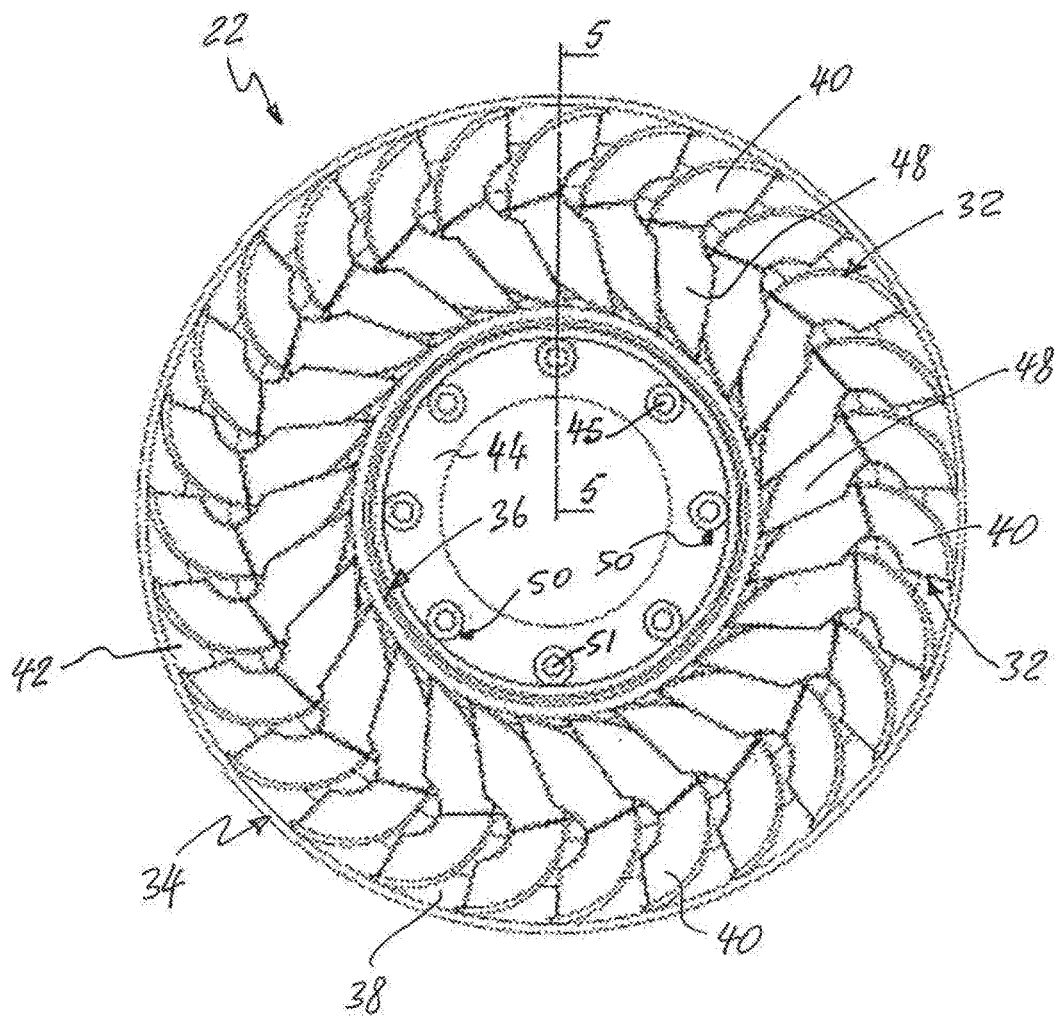
FIG. 4 is a front elevational view of the turbine assembly in accordance with the first exemplary embodiment of the present invention.
Figure 6:
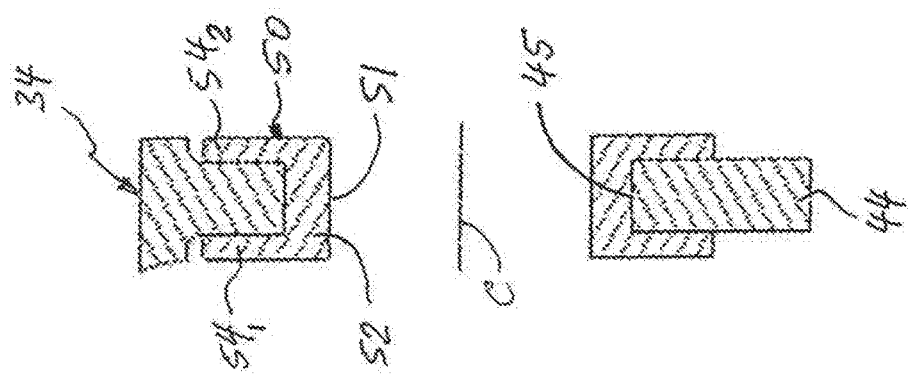
FIG. 6 is an enlarged view of a fragment of the turbine assembly shown in the rectangle "6" of FIG. 5.
Figure 5:
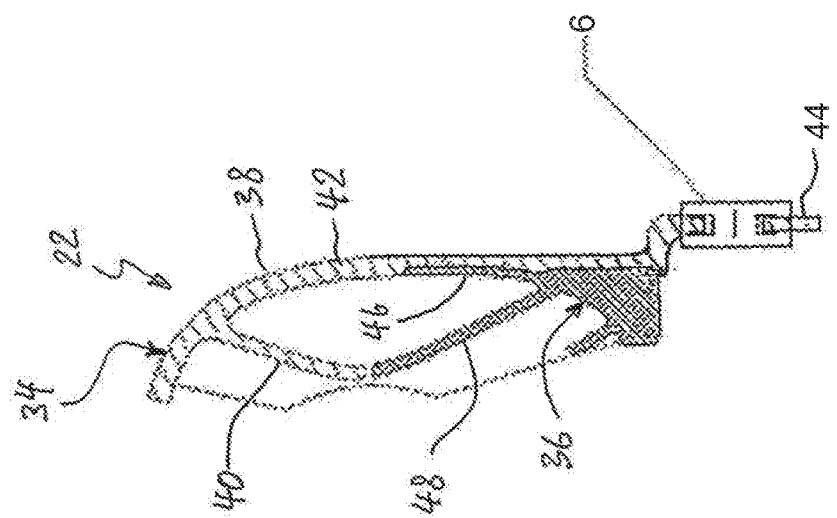
FIG. 5 is a partial sectional view the turbine assembly taken along the line 5-5 in FIG. 4.

Furthermore, the turbine assembly 22 comprises a first turbine component 34 rotatable about the rotational axis X, and a second turbine component 36 formed separately from and non-moveably secured to the first turbine component 34 coaxially therewith, as best shown in FIGS. 1, 4 and 5. As illustrated in FIGS. 1, 3, 4 and 5, an outer radius (or diameter) of the first turbine component 34 is significantly larger than the outer radius (or diameter) of the second turbine component 36. As further illustrated in FIGS. 3 and 5, the first turbine component 34 includes a substantially annular first turbine shell member 38 and a plurality of first turbine blade members 40 integrally formed therewith and outwardly extending from the first turbine shell member 38, so as to face the impeller blades 25 of the impeller assembly 20. Preferably, the first turbine shell member 38 and the first turbine blade members 40 are made of a single or unitary (i.e., one-piece) component, but may be separate components fixedly (i.e., non-moveably) connected together. The first turbine shell member 38 has a substantially semi-toroidal radially outer portion 42 and a substantially annular mounting portion 44 located radially within the radially outer portion 42 of the first turbine shell member 38. The mounting portion 44 of the first turbine shell member 38 is provided with a plurality of equiangular circumferentially spaced mounting holes 45, as best shown in FIGS. 2 and 6. The first turbine shell member 38 is fixedly secured to the turbine hub 28 by rivets 27 extending through the mounting holes 45 in the mounting portion 44 of the first turbine shell member 38.

The mounting holes 45 are circumferentially equiangularly spaced, as best shown in FIG. 3, and configured to engage the rivets 27. As seen in FIGS. 2, 3 and 6, each of the mounting holes 45 is circumscribed by a grommet 50. The grommets 50 are mounted to the mounting portion 44 of the first turbine shell member 38 around the mounting holes 45 as a reinforcement, so that each of the rivets 27 axially extends through an opening 51 in one of the grommets 50 in order to non-movably (i.e., fixedly) secure the turbine shell 30 of the turbine assembly 22 to the turbine hub 28. Each of the grommets 50 includes a cylindrical portion 52, and two axially opposite annular flanges $54_1$ and $54_2$ extending radially outwardly from the cylindrical portion 52 of the grommet 50. A central axis C of the cylindrical portion 52 is substantially parallel to the rotational axis X. As best shown in FIGS. 2 and 6, the flanges $54_1$ and $54_2$ of the grommet 50 are axially spaced from each other so as to provide a gap therebetween for receiving the mounting portion 44 of the first turbine shell member 38 around the mounting holes 45. Thus, the mounting portion 44 of the first turbine shell member 38 is sandwiched between the annular flanges $54_1$ and $54_2$ of the grommet 50 so that the annular flanges $54_1$ and $54_2$ engage axially opposite sides of the mounting portion 44 of the first turbine shell member 38. The grommets 50 may be made of a rigid material, such as metal, plastic or polymer. According to the first exemplary embodiment of the present invention, the grommets 50 are made of steel, such as SAE 1020 carbon steel. The first turbine component 34 is made integrally with the grommets 50 by molding the plastic material of the first turbine component 34 over and around the grommets 50.

As further illustrated in FIG. 3, the second turbine component 36 is formed separately from the first turbine component 34 and includes a substantially annular second turbine shell member 46, and a plurality of second turbine blade members 48 integrally formed therewith and outwardly extending from an annular, substantially semi-toroidal (i.e., concave) inner surface of the second turbine shell member 46 so as to face the impeller blades 25 of the impeller assembly 20. Preferably, the second turbine shell member 46 and the second turbine blade members 48 are made as a single or unitary (i.e., one-piece) component, but may be separate components fixedly (i.e., non-moveably) connected together.

The first turbine component 34 and the second turbine component 36 are formed separately, and then non-moveably, coaxially assembled together so as to form the turbine assembly 22. Specifically, the second turbine shell member 46 of the second turbine component 36 non-moveably engages the first turbine component 34 by appropriate means known in the art, such as adhesive bonding, ultrasonic welding, friction welding, etc. The second turbine shell member 46 of the second turbine component 36 non-moveably engages the first turbine shell member 38 of the first turbine component 34 so as to define together the turbine shell 30 of the turbine assembly 22. As best illustrated in FIGS. 1, 4 and 5, each of the first turbine blade members 40 is oriented adjacent to one of the second turbine blade members 48 so as to define together the turbine blades 32 of the turbine assembly 22.

According to the present embodiment, the first and second turbine components 34 and 36, respectively, are made by casting of aluminum or magnesium alloys or, preferably, by molding plastic material. Preferably, the first turbine component 34 and the second turbine component 36 are made of polymeric material. In other words, the first turbine component 34 and the second turbine component 36 can be made of the same or different materials having different or same mechanical characteristics, such as different strengths, specific weights, densities, moduli of elasticity, melting points, etc.

Moreover, as best shown in FIGS. 1 and 5, the first turbine component 34 and the second turbine component 36 have a variable thickness. In fact, both the first turbine shell member 38 and the first turbine blade members 40 of the first turbine component 34 have a variable thickness, as best shown in FIGS. 1 and 5. Similarly, both the second turbine shell member 46 and the second turbine blade members 48 of the second turbine component 36 have a variable thickness, as best shown in FIGS. 1 and 5.

Accordingly, the molded turbine assembly 22 can have variation in thickness, and be formed in a very preferred form and shape. Also, the molded turbine assembly can have reinforcing ribs. Thus, with the molded turbine assembly of the present invention there is a possibility for mass optimization by putting the thickness where it is needed for strength and reducing the thickness where it is not needed, where stress and deformation are low, and thus weight minimized.

The torsional vibration damper 16 advantageously allows the turbine assembly 22 of the torque converter 14 to be coupled, with torque damping, to the input shaft of the automatic transmission. The torsional vibration damper 16 also allows damping of stresses between a first, drive shaft (not shown) and a second, driven shaft (not shown) that are coaxial with the rotational axis X, with torsion damping.

The torsional vibration damper 16, as best shown in FIG. 1, is disposed between the turbine hub 28 that is fixedly (i.e., non-movably) connected with the turbine shell 30 of the turbine assembly 22, and a locking piston 72 of the lock-up clutch 15. The locking piston 72 of the lock-up clutch 15 is rotatably mounted to the turbine assembly 22 and the turbine hub 28 by the torsional vibration damper 16. Moreover, the locking piston 72 is axially moveable on the turbine hub 28 along the rotational axis X. The torsional vibration damper 16 is arranged on the turbine hub 28 in a limited, movable and centered manner. The turbine hub 28 forms an output part of the torsional vibration damper 16 and a driven side of the torque-coupling device 10, and is splined with the driven shaft. The locking piston 72, on the other hand, forms an input part of the torsional vibration damper 16.

As best shown in FIGS. 1 and 3, the torsional vibration damper 16 comprises a substantially annular input member 60 operatively connected to the locking piston 72, an output member 68, and a plurality of circumferentially disposed elastic members 66 elastically coupling the output member 68 to the input member 60. In other words, the output member 68 is rotatably moveable relative thereto and the input member 60. The elastic members 66 are disposed in series relative to each other between the input member 60 and the output member 68, as best shown in FIGS. 1 and 3. According to the exemplary embodiment of FIGS. 1 and 3, the elastic members 66 are configured as helical (or coil) springs having a principal axis oriented substantially circumferentially. Other elastic members may be selected to replace or supplement the springs 66.

The output member 68 is provided with a plurality of equiangular circumferentially spaced holes 69, as best shown in FIG. 3. The output member 68 is fixedly (i.e., non-movably) secured to the turbine hub 28 by the rivets 27 extending through the holes 69 in the output member 68, as best shown in FIGS. 1 and 2. Thus, the turbine shell 30 of the turbine assembly 22 is fixedly secured to both the turbine hub 28 and the output member 68 by the rivets 27 axially extending through the grommets 50, while the input member 60 is operatively connected to the locking piston 72.

A method for making the turbine assembly 22 is as follows. It should be understood that this exemplary method may be practiced in connection with the other embodiments described herein. This exemplary method is not the exclusive method for assembling the turbine assembly described herein. While the methods for assembling the turbine assembly 22 may be practiced by sequentially performing the steps as set forth below, it should be understood that the methods may involve performing the steps in different sequences.

First, the steel grommets 50 are provided. Each of the grommets 50 has the cylindrical portion 52, and two axially opposite annular flanges $54_1$ and $54_2$ extending radially outwardly from the cylindrical portion 52 of the grommet 50. The first turbine component 34 and the second turbine component 36 of the turbine assembly 22 are formed separately from each other.

The first turbine component 34 is made by injection molding the plastic material integrally with the grommets 50, thus molding the plastic material over and around the cylindrical portion 52 of the grommets 50 so as to sandwich the mounting portion 44 of the first turbine component 34 between the two axially opposite annular flanges $54_1$ and $54_2$ of the grommets 50. Next, the second turbine component 36 is made by casting aluminum or magnesium alloys or by molding plastic, preferably a polymeric material. The first turbine shell member 38 is made larger than the second turbine shell member 46 and is formed with a substantially semi-toroidal radially outer portion 42 and a substantially annular mounting portion 44 provided with a plurality of the grommets 50, each grommet 50 defining the opening 51 therethrough.

Then, the second turbine shell member 46 of the second turbine component 36 is axially aligned and non-moveably secured to the first turbine shell member 38 of the first turbine component 34 by appropriate means known in the art, such as adhesive bonding, ultrasonic welding, friction welding, etc., so as to define together the turbine shell 30 of the turbine assembly 22.

A method for making the hydrokinetic torque-coupling device 10 is as follows.

First, the impeller assembly 20, the stator 24, and the damper assembly 16 may each be preassembled. The impeller assembly 20 is formed by stamping from steel blanks. The stator 24 is made by injection molding a polymeric material. The turbine assembly 22 is assembled as described above.

The impeller assembly 20, the turbine assembly 22 and the stator 24 subassemblies are assembled together so as to form the torque converter 14. The damper assembly 16 and the turbine hub 28 are then added. Next, the turbine shell 30 of the turbine assembly 22 is non-movably (i.e., fixedly) secured to the turbine hub 28 and the output member 68 of the torsional vibration damper 16 by appropriate means, such as by rivets 27 or threaded fasteners extending through the holes 45 in the mounting portion 44 of the first turbine shell member 38, the turbine hub 28 and the output member 68 of the torsional vibration damper 16, as illustrated in FIG. 1. More specifically, each of the rivets 27 axially extends through an associated opening 51 in one of the grommets 50 over-molded in the turbine shell 30. Then, the first casing shell 17 is non-moveably and sealingly secured, such as by welding at 19, to the second casing shell 18, as best shown in FIG. 1.

Various modifications, changes, and alterations may be practiced with the above-described embodiment, including but not limited to the additional embodiments shown in FIGS. 7-30. In the interest of brevity, reference characters in FIGS. 7-30 that are discussed above in connection with FIGS. FIGS. 1-6 are not further elaborated upon below, except to the extent necessary or useful to explain the additional embodiments of FIGS. 7-30. Modified components and parts are indicated by the addition of a hundred digits to the reference numerals of the components or parts.

In a hydrokinetic torque-coupling device 110 of a second exemplary embodiment illustrated in FIGS. 7-12, the turbine assembly 22 is replaced by a turbine assembly 122. The hydrokinetic torque coupling device 110 of FIGS. 7-12 corresponds substantially to the hydrokinetic torque coupling device 10 of FIGS. 1-6, and only the turbine assembly 122, which is the primary difference, will therefore be explained in detail below.

The turbine assembly 122, as best shown in FIGS. 7 and 9-11, comprises a substantially annular, semi-toroidal (or concave) turbine shell 130 rotatable about the rotational axis X, and a plurality of turbine blades 132 fixedly (i.e., non-moveably) secured to the turbine shell 130 and outwardly extending from the turbine shell 130 so as to face the impeller blades 25 of the impeller assembly 20. The turbine shell 130 of the turbine assembly 122 is non-movably (i.e., fixedly) secured to the turbine hub 28 by appropriate means, such as by rivets 27 or threaded fasteners.

Figure 9:
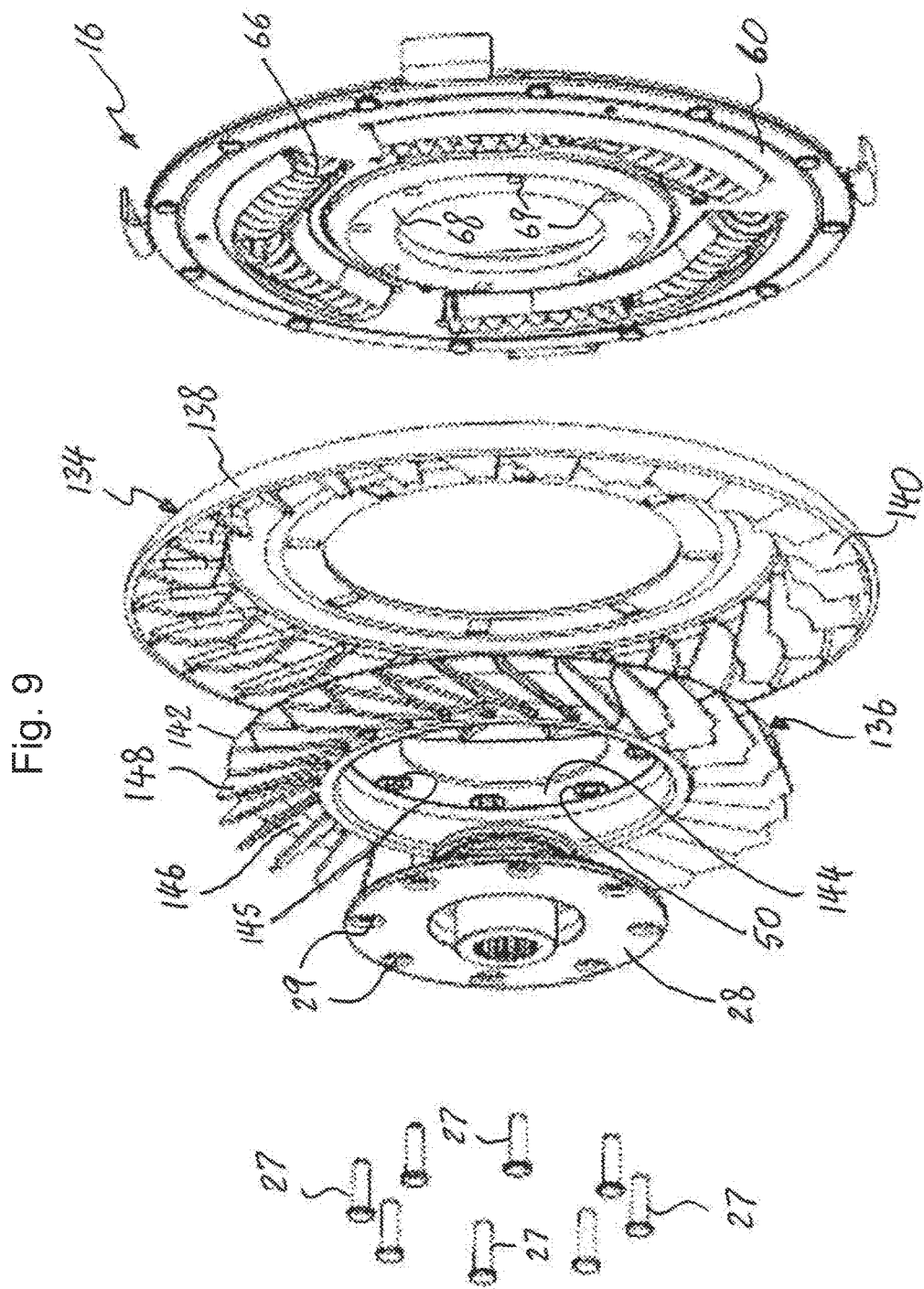
FIG. 9 is a front partial exploded perspective view of a turbine hub, a damper assembly and the turbine assembly in accordance with the second exemplary embodiment of the present invention.
Figure 10:
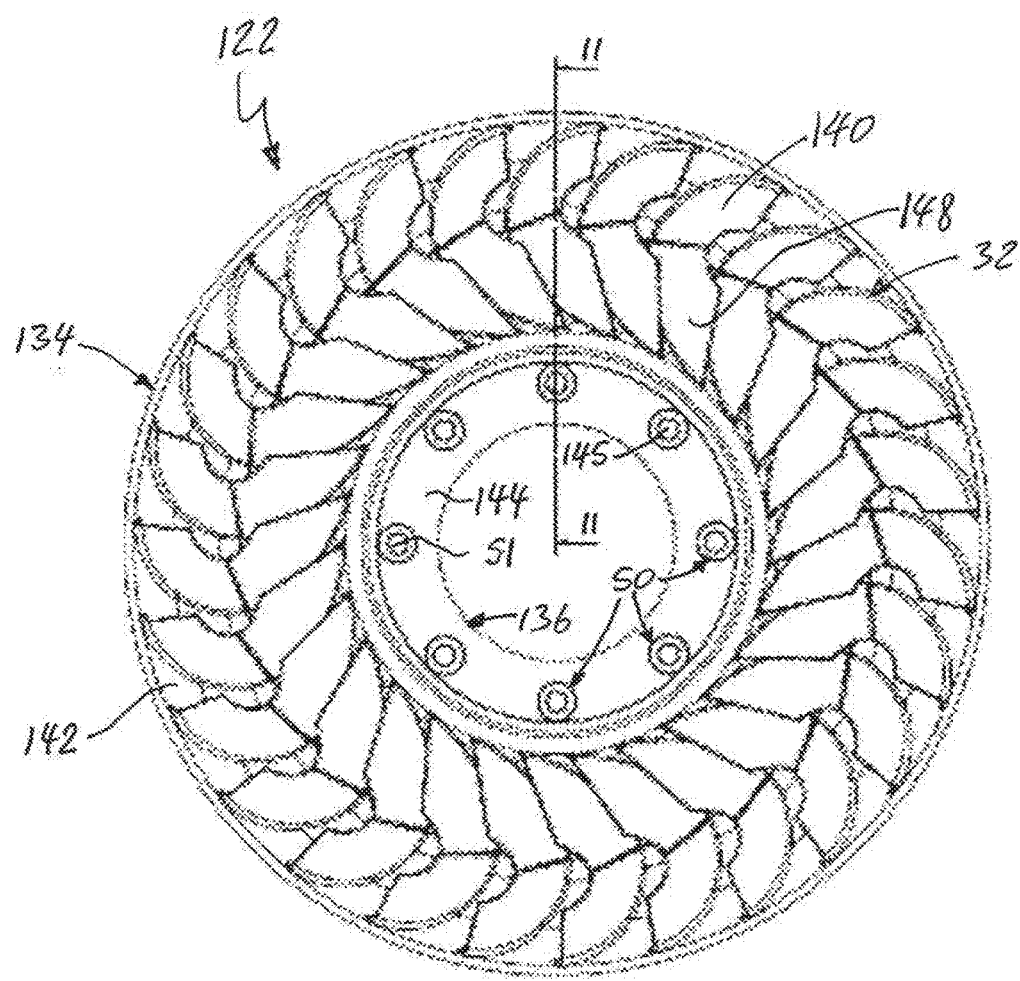
FIG. 10 is a front elevational view of the turbine assembly in accordance with the second exemplary embodiment of the present invention.
Figure 11:
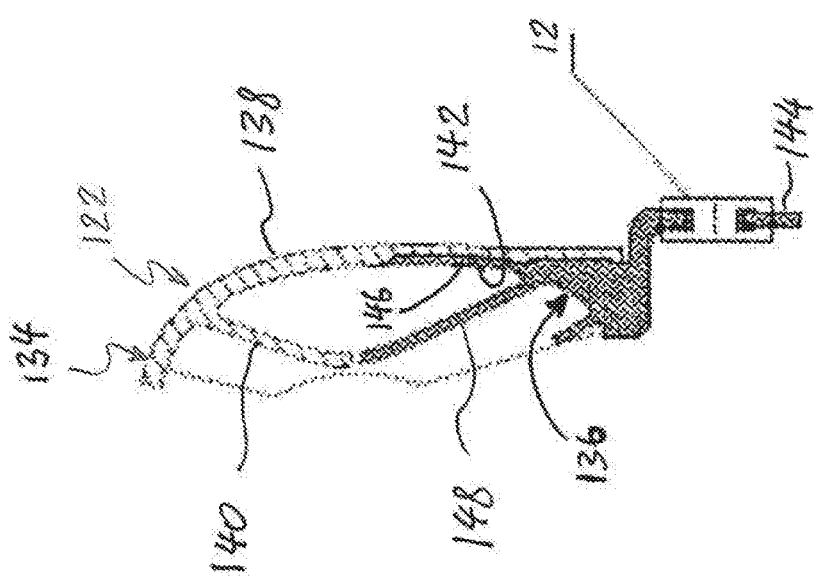
FIG. 11 is a partial sectional view the turbine assembly taken along the line 11-11 in FIG. 10.

Furthermore, the turbine assembly 122 comprises a first turbine component 134 rotatable about the rotational axis X, and a second turbine component 136 formed separately from and non-moveably secured to the first turbine component 134 coaxially therewith, as best shown in FIGS. 7, 10 and 11. As illustrated in FIGS. 9 and 11, the first turbine component 134 includes a substantially annular first turbine shell member 138 and a plurality of first turbine blade members 140 integrally formed therewith, and outwardly extending from the first turbine shell member 138 so as to face the impeller blades 25 of the impeller assembly 20. Preferably, the first turbine shell member 138 and the first turbine blade members 140 are made as a single or unitary (i.e., one-piece) component, but may be separate components fixedly (i.e., non-moveably) connected together.

As further illustrated in FIGS. 9-11, the second turbine component 136 is formed separately from the first turbine component 134, and includes a substantially annular second turbine shell member 146, and a plurality of second turbine blade members 148 integrally formed therewith and outwardly extending from an annular, substantially semi-toroidal (i.e., concave) inner surface of the second turbine shell member 146 so as to face the impeller blades 25 of the impeller assembly 20. Preferably, the second turbine shell member 146 and the second turbine blade members 148 are made as a single or unitary (i.e., one-piece) component, but may be separate components fixedly (i.e., non-moveably) connected together.

Figure 12:
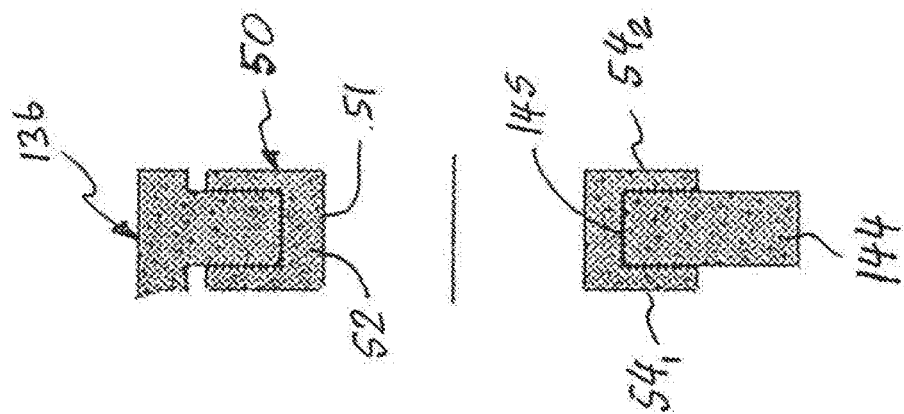
FIG. 12 is an enlarged view of a fragment of the turbine assembly shown in the rectangle "12" of FIG. 11.

The second turbine shell member 146 has a substantially semi-toroidal radially outer portion 147 and a substantially annular mounting portion 149 located radially within the radially outer portion 147 of the second turbine shell member 146. The second turbine blade members 148 are integrally formed with and outwardly extend from the radially outer portion 147 of the second turbine shell member 146. The mounting portion 149 of the second turbine shell member 146 is provided with a plurality of equiangular circumferentially spaced holes 159, as best shown in FIGS. 9 and 12. The second turbine shell member 146 is fixedly secured to the turbine hub 28 by rivets 27 extending through the holes 159 in the mounting portion 149 of the second turbine shell member 146 of the second turbine component 136.

Figure 8:
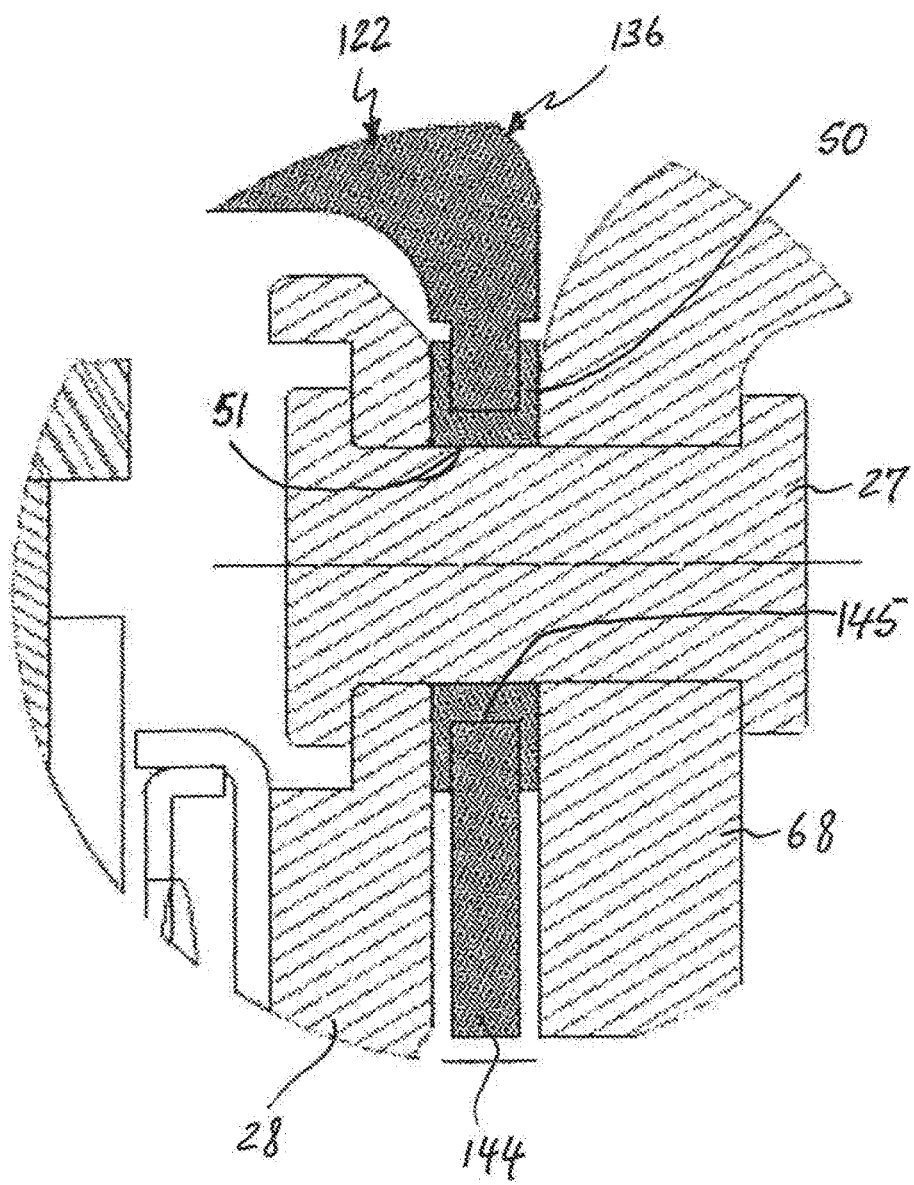
FIG. 8 is an enlarged view of a fragment of the hydrokinetic torque-coupling device shown in the circle "8" of FIG. 7.

The holes 159 are circumferentially equiangularly spaced, as best shown in FIG. 9, and configured to engage the rivets 27. As seen in FIGS. 8, 9 and 12, each of the holes 159 is circumscribed by a grommet 50. The grommets 50 are mounted to the mounting portion 149 of the second turbine component 136 around the holes 159 as a reinforcement, so that each of the rivets 27 axially extends through an opening 51 in one of the grommets 50 in order to non-movably (i.e., fixedly) secure the turbine shell 130 of the turbine assembly 122 to the turbine hub 28. As best shown in FIGS. 8 and 12, the flanges $54_1$ and $54_2$ of the grommets 50 are axially spaced from each other so as to provide a gap therebetween for receiving the mounting portion 149 of the second turbine shell member 146. Thus, the mounting portion 149 of the second turbine component 136 is sandwiched between the annular flanges $54_1$ and $54_2$ of the grommets 50 so that the annular flanges $54_1$ and $54_2$ engage axially opposite sides of the mounting portion 149 of the second turbine shell member 146. According to the second exemplary embodiment of the present invention the second turbine component 136 is made integrally with the steel grommets 50 by molding the plastic material of the second turbine component 136 over and around the grommets 50.

The first turbine component 134 and the second turbine component 136 are formed separately, and then non-moveably, coaxially connected together so as to form the turbine assembly 122. Specifically, the second turbine shell member 146 of the second turbine component 136 non-moveably engages the first turbine component 134 by appropriate means known in the art, such as adhesive bonding, ultrasonic welding, friction welding, etc. The second turbine shell member 146 of the second turbine component 136 non-moveably engages the first turbine shell member 138 of the first turbine component 134 so as to define together the turbine shell 130 of the turbine assembly 122. As best illustrated in FIGS. 7, 10 and 11, each of the first turbine blade members 140 is oriented adjacent to one of the second turbine blade members 148, so as to define together the turbine blades 132 of the turbine assembly 122. Also, the second turbine shell member 146 of the second turbine component 136 non-moveably engages the first turbine shell member 138 of the first turbine component 134 so as to define together the turbine shell 130 of the turbine assembly 122.

According to the present embodiment, the first and second turbine components 134 and 136, respectively, are made by casting of aluminum or magnesium alloys or by molding plastic material, or they may be formed by plastic deformation of a metallic material such as sheet steel. Preferably, the first turbine component 134 and the second turbine component 136 are made by injection molding a thermoplastic or thermosetting plastic material. In other words, the first turbine component 134 and the second turbine component 136 could be made of the same or different materials having different or same mechanical characteristics, such as different strengths, specific weights, densities, moduli of elasticity, etc.

A method for making the turbine assembly 122 is as follows. First, the steel grommets 50 are provided. Each of the grommets 50 has the cylindrical portion 52, and two axially opposite annular flanges $54_1$ and $54_2$ extending radially outwardly from the cylindrical portion 52 of the grommet 50. Then, the first turbine component 134 and the second turbine component 136 of the turbine assembly 122 are formed separately from each other. The first turbine component 134 is made by casting of aluminum or magnesium alloys or by molding plastic material. Next, the second turbine component 136 is made by injection molding the plastic material integrally with the grommets 50 by molding the plastic material over and around the grommets 50. The second turbine shell member 146 is formed with a substantially semi-toroidal radially outer portion 147 and a substantially annular mounting portion 149 provided with a plurality of the grommets 50 each defining the opening 51 therethrough.

Then, the second turbine shell member 146 of the second turbine component 136 is axially aligned with and non-moveably secured to the first turbine shell member 138 of the first turbine component 134 by appropriate means known in the art, such as adhesive bonding, ultrasonic welding, friction welding, etc., so as to define together the turbine shell 130 of the turbine assembly 122.

A method of assembling the hydrokinetic torque-coupling device 110 is substantially similar to the method of assembling the hydrokinetic torque-coupling device 10 according to the first exemplary embodiment of the present invention described above.

In a hydrokinetic torque-coupling device 210 of a third exemplary embodiment illustrated in FIGS. 13-22, the turbine assembly 22 is replaced by a turbine assembly 222. The hydrokinetic torque coupling device 210 of FIGS. 13-22 corresponds substantially to the hydrokinetic torque coupling device 10 of FIGS. 1-6, and only the turbine assembly 222, which is the primary difference, will therefore be explained in detail below.

The turbine assembly 222, as best shown in FIGS. 7 and 9-11, comprises a substantially annular, semi-toroidal (or concave) turbine shell 230 rotatable about the rotational axis X, and a plurality of turbine blades 232 fixedly (i.e., non-moveably) secured to the turbine shell 230 and outwardly extending from the turbine shell 230 so as to face the impeller blades 25 of the impeller assembly 20. The turbine shell 230 of the turbine assembly 222 is non-movably (i.e., fixedly) secured to the turbine hub 28 by appropriate means, such as by rivets 27 or threaded fasteners.

Figure 13:
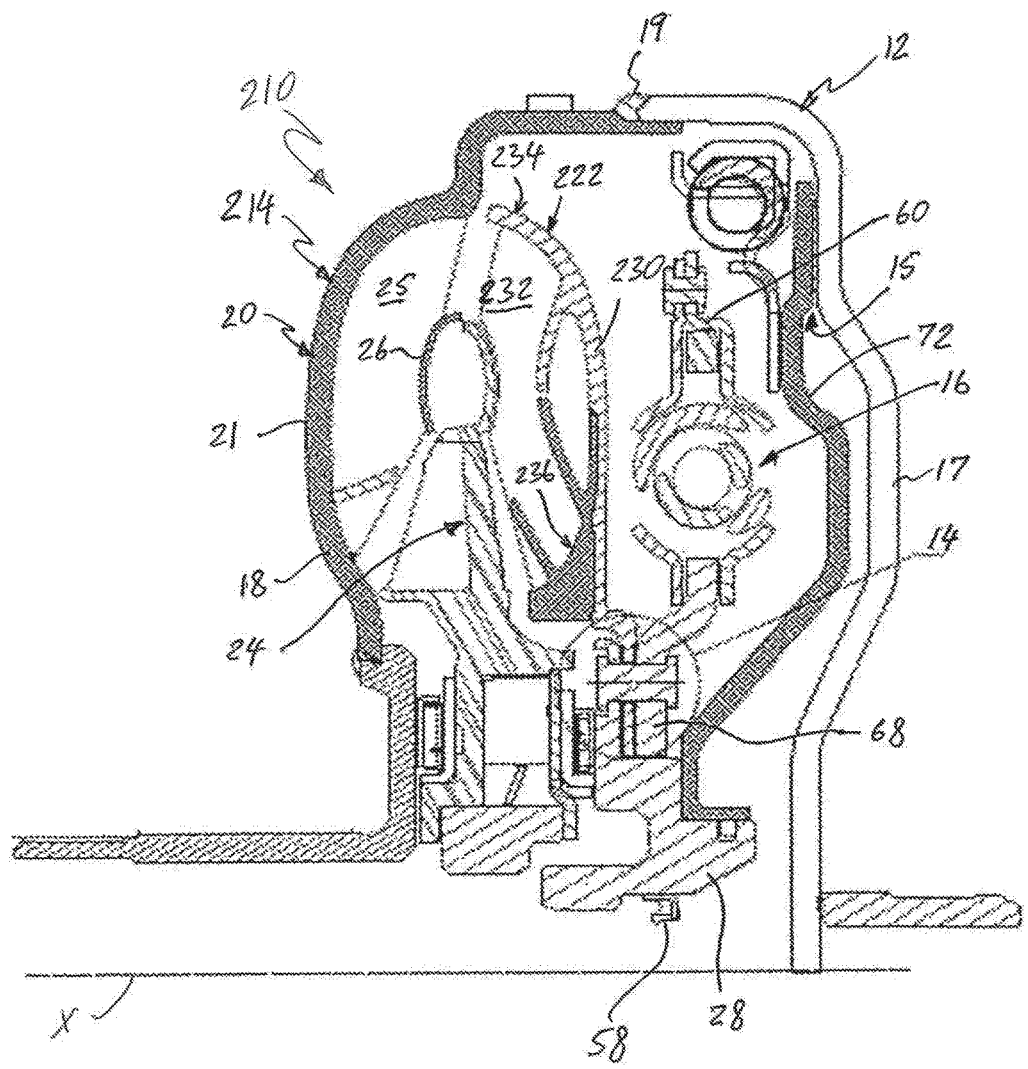
FIG. 13 is a fragmented half-view in axial section of a torque-coupling device with a turbine assembly in accordance with a third exemplary embodiment of the present invention.
Figure 14:
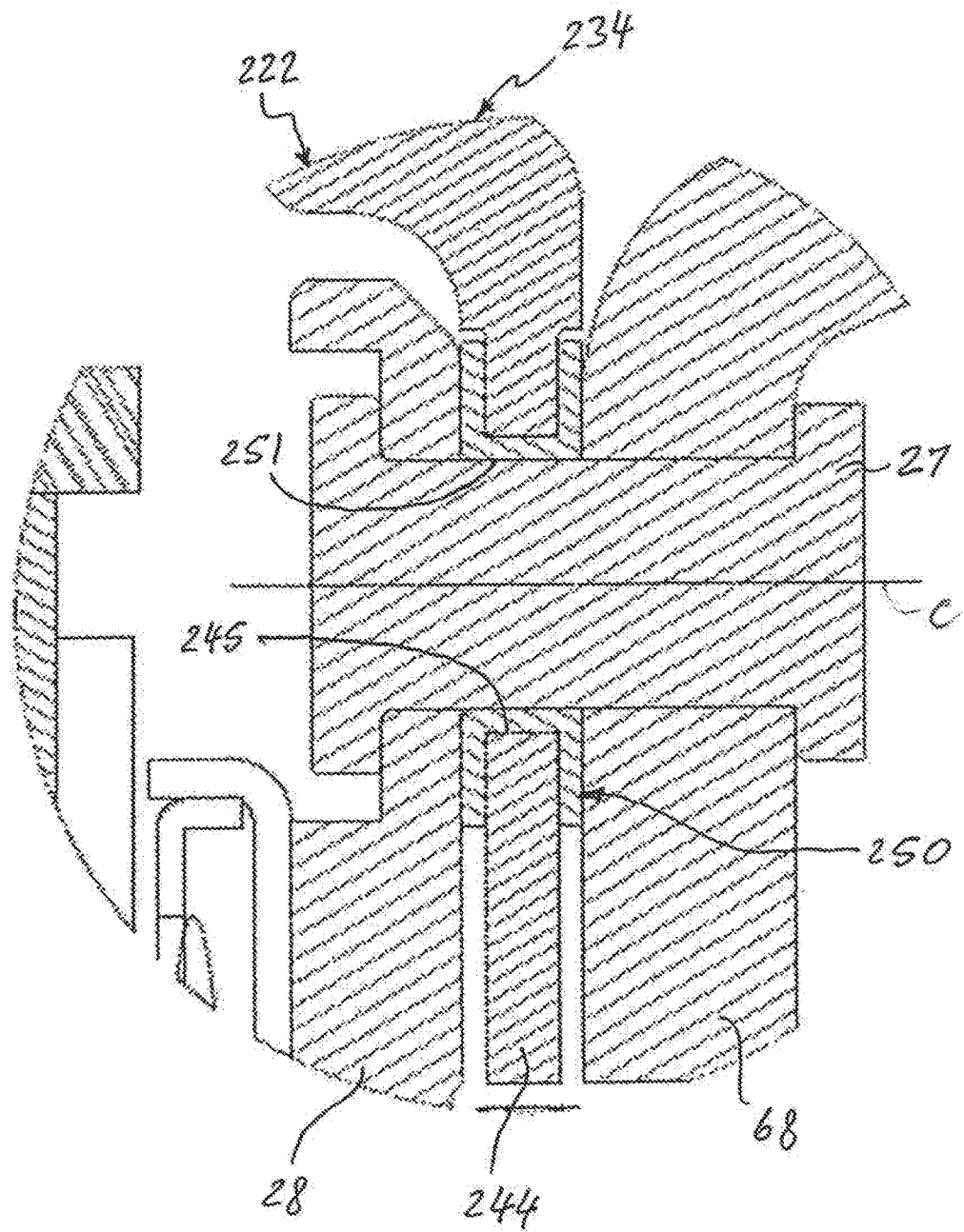
FIG. 14 is an enlarged view of a fragment of the hydrokinetic torque-coupling device shown in the circle "14" of FIG. 13.
Figure 15A:
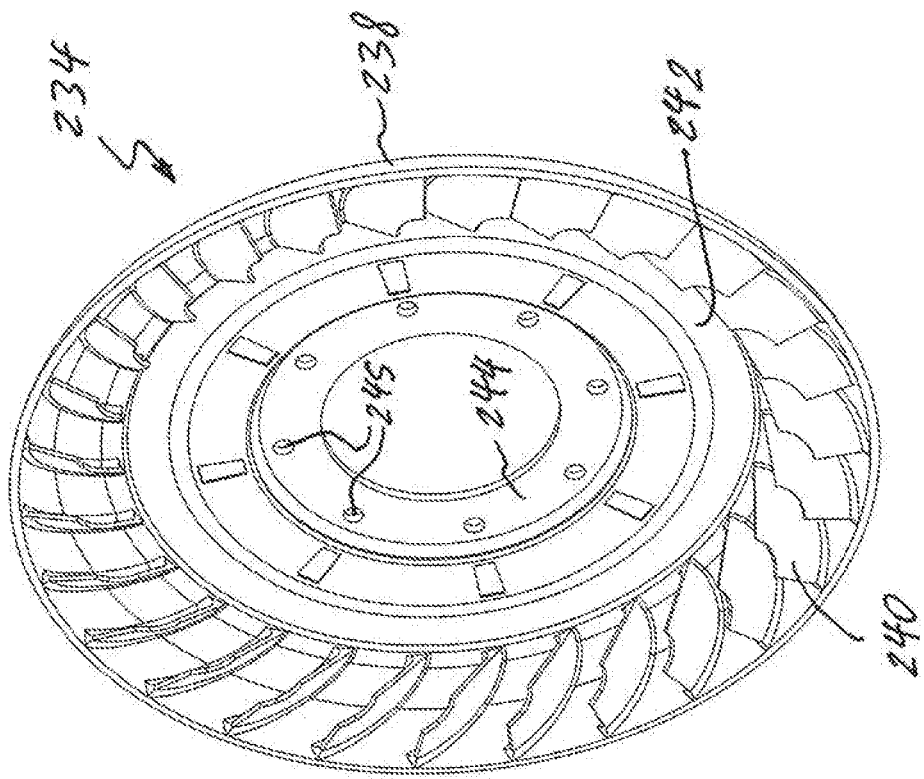
FIG. 15A is a front perspective view of a first turbine component of the turbine assembly in accordance with the third exemplary embodiment of the present invention.
Figure 15B:
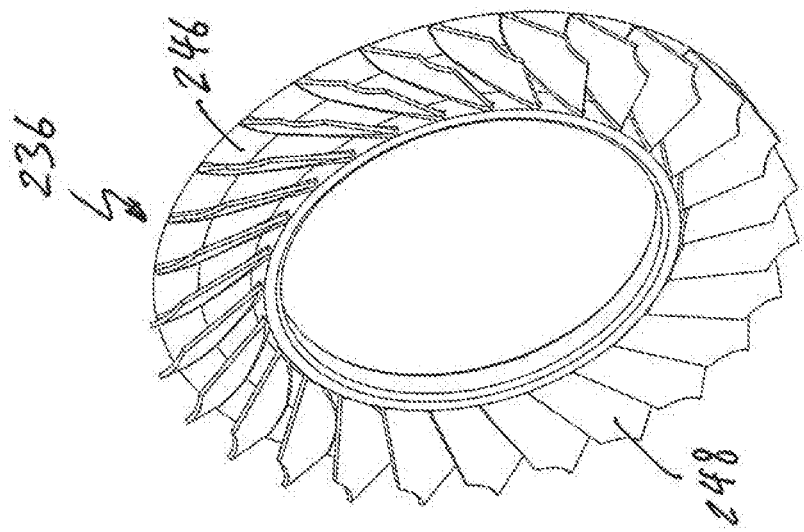
FIG. 15B is a front perspective view of a second turbine component of the turbine assembly in accordance with the third exemplary embodiment of the present invention
Figure 15C:
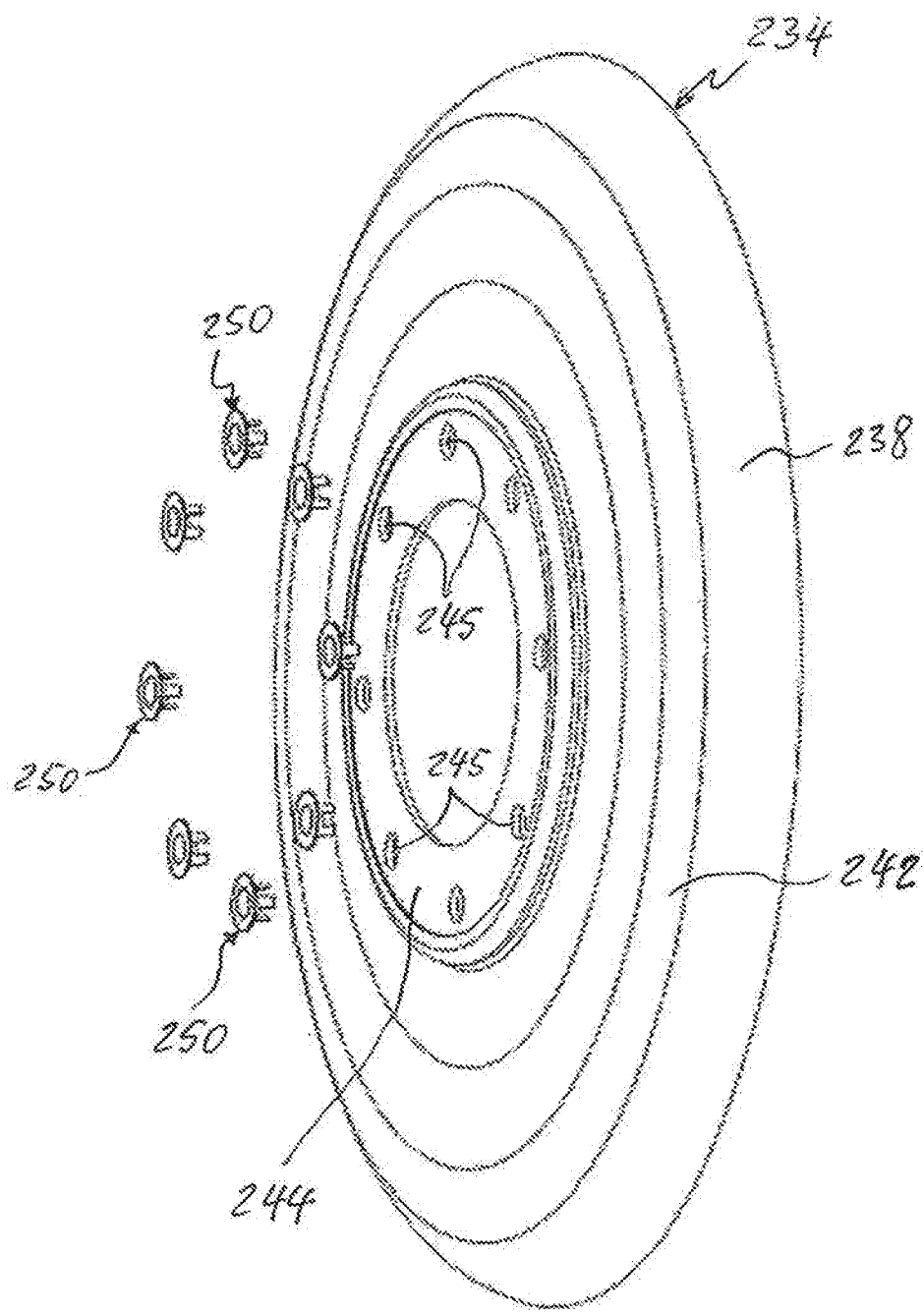
FIG. 15C is a rear perspective view of the first turbine component of the turbine assembly in accordance with the third exemplary embodiment of the present invention.
Figure 19:
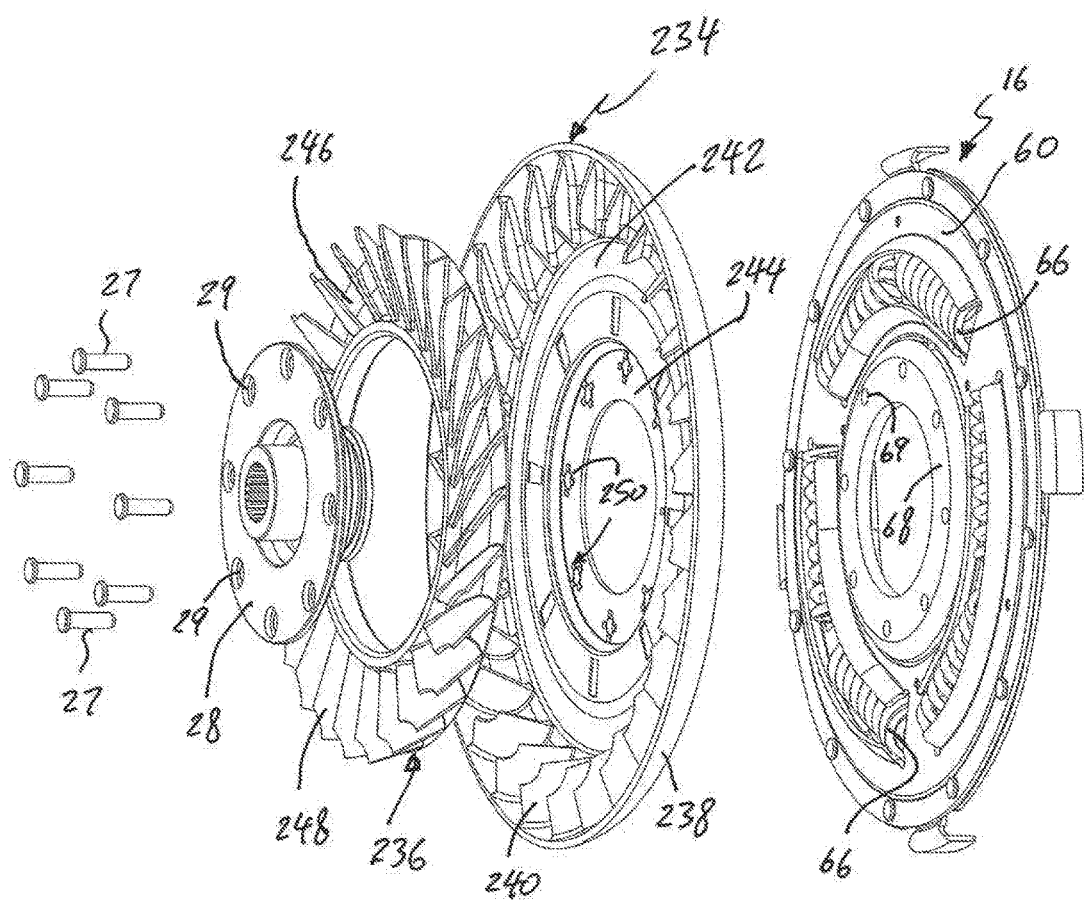
FIG. 19 is a front partial exploded perspective view of a turbine hub, a damper assembly and the turbine assembly in accordance with the third exemplary embodiment of the present invention.
Figure 20:
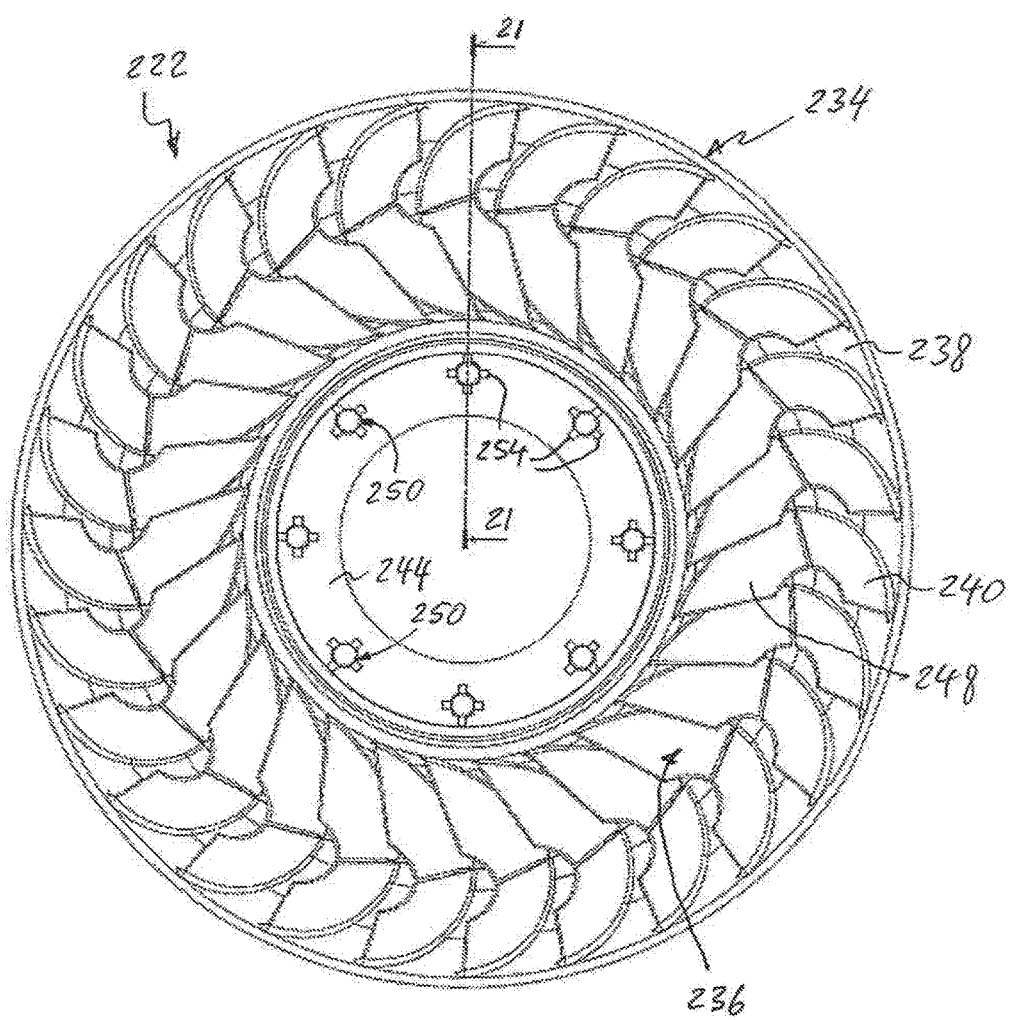
FIG. 20 is a front elevational view of the turbine assembly in accordance with the third exemplary embodiment of the present invention.
Figures 21, 22:
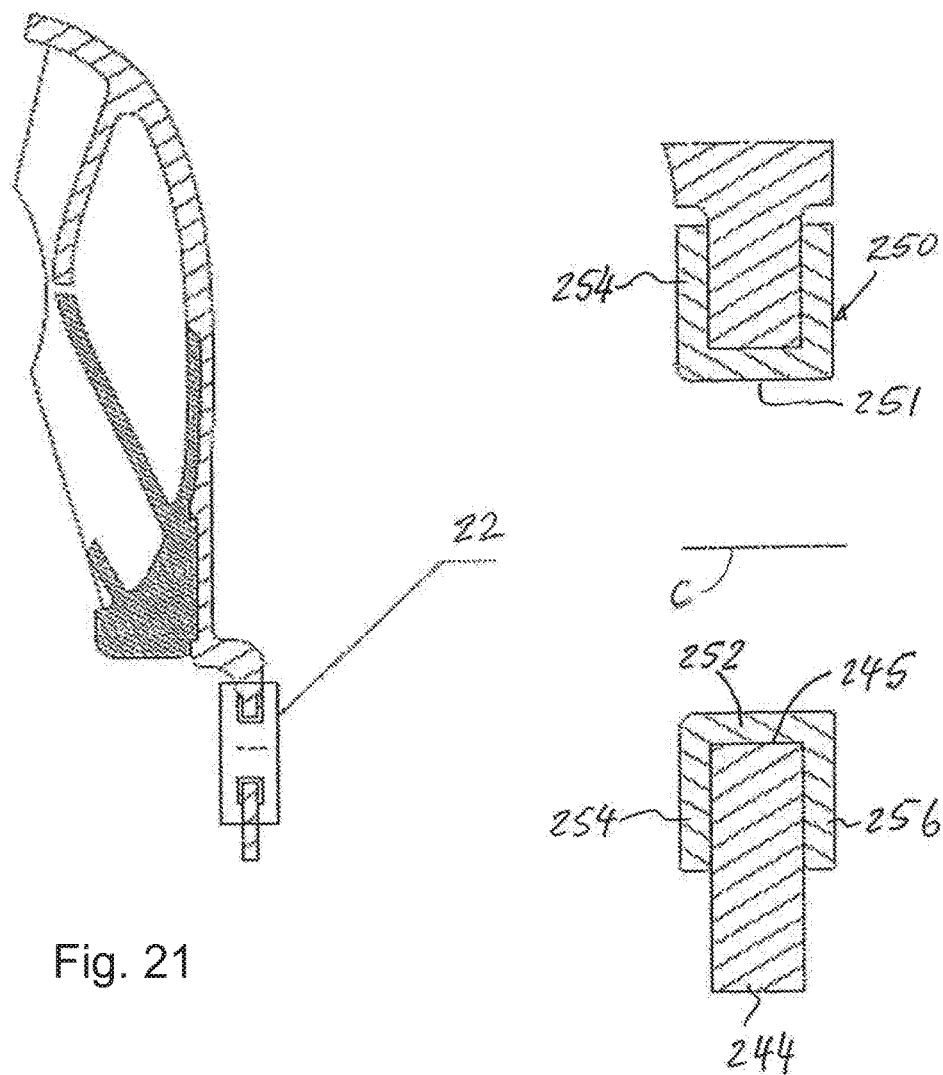
FIG. 21 is a partial sectional view the turbine assembly taken along the line 21-21 in FIG. 20.
FIG. 22 is an enlarged view of a fragment of the turbine assembly shown in the rectangle "22" of FIG. 21.

The turbine assembly 222 comprises a first turbine component 234 rotatable about the rotational axis X, and a second turbine component 236 formed separately from and non-moveably secured to the first turbine component 234 coaxially therewith, as best shown in FIGS. 13, 20 and 21. As illustrated in FIGS. 15, 16 and 19, the first turbine component 234 includes a substantially annular first turbine shell member 238 and a plurality of first turbine blade members 240 integrally formed therewith and outwardly extending from the first turbine shell member 238, so as to face the impeller blades 25 of the impeller assembly 20. Preferably, the first turbine shell member 238 and the first turbine blade members 240 are made as a single or unitary (i.e., one-piece) component, but may be separate components fixedly (i.e., non-moveably) connected together. The first turbine shell member 238 has a substantially semi-toroidal radially outer portion 242 and a substantially annular mounting portion 244 located radially within the radially outer portion 242 of the first turbine shell member 238. The mounting portion 244 of the first turbine shell member 238 is provided with a plurality of equiangular circumferentially spaced mounting holes 245, as best shown in FIGS. 15, 17 and 22. The first turbine shell member 238 is fixedly secured to the turbine hub 28 by the rivets 27 extending through the mounting holes 245 in the mounting portion 244 of the first turbine shell member 238.

The mounting holes 245 are circumferentially equiangularly spaced, as best shown in FIG. 15, and configured to engage the rivets 27. As seen in FIGS. 19 and 20, each of the mounting holes 245 is circumscribed by a grommet 250. The grommets 250 are mounted to the mounting portion 244 of the first turbine shell member 238 around the mounting holes 245 as a reinforcement, so that each of the rivets 27 axially extends through an opening 251 in one of the grommets 250 in order to non-movably (i.e., fixedly) secure the turbine shell 230 of the turbine assembly 222 to the turbine hub 28. Each of the grommets 250 includes an axially extending cylindrical portion 252 having two axially opposite ends, and an annular flange 256 extending radially outwardly from a proximal (or first) end of the cylindrical portion 252 of each grommet 250. A central axis C of the cylindrical portion 252 is substantially parallel to the rotational axis X, as best shown in FIGS. 17 and 22.

A distal (or second) end of the cylindrical portion 252 is provided with two or more retainer elements 254, which initially, before securing to the mounting portion 244 of the first turbine shell member 238, extend axially along the cylindrical portion 252 in the direction parallel to the central axis C, as shown in FIGS. 16 and 17. However, after securing the grommets 250 to the mounting portion 244 of the first turbine shell member 238, the retainer elements 254 extend radially outwardly from the distal end of the cylindrical portions 252 of the grommets 250 substantially parallel to the annular flanges 256, as shown in FIGS. 14, 19, 20 and 22. Also, each of the grommets 250 has a through opening 251 therein defined by the cylindrical portion 252 of the grommet 250.

As further shown in FIGS. 14, 19, 20 and 22, the retainer elements 254 and the annular flanges 256 of the grommets 250 in an assembled position (i.e., secured to the first turbine shell member 238) are axially spaced from each other, so as to provide a gap therebetween for receiving the mounting portion 244 of the first turbine shell member 238 around the mounting holes 245. Thus, the mounting portion 244 of the first turbine shell member 238 is sandwiched between the retainer elements 254 and the annular flanges 256 of the grommets 250. In other words, the retainer elements 254 and the annular flanges 256 engage axially opposite sides of the mounting portion 244 of the first turbine shell member 238. The grommets 250 may be made of a rigid material, such as metal, plastic or polymer. According to the exemplary embodiment of the present invention the grommets 250 are made of steel, such as SAE 1020 carbon steel, which has a good combination of strength and ductility and may be hardened or carburized, and is readily cold worked by conventional methods.

The first turbine component 234 is made separately from the grommets 250, and then the grommets 250 are secured (or fixed) to the first turbine component 234 around the mounting holes 245 in the mounting portion 244 of the first turbine shell member 238.

As further illustrated in FIG. 19, the second turbine component 236 is formed separately from the first turbine component 234 and includes a substantially annular second turbine shell member 246, and a plurality of second turbine blade members 248 integrally formed therewith and outwardly extending from an annular, substantially semi-toroidal (i.e., concave) inner surface of the second turbine shell member 246, so as to face the impeller blades 25 of the impeller assembly 20. Preferably, the second turbine shell member 246 and the second turbine blade members 248 are made as a single or unitary (i.e., one-piece) component, but may be separate components fixedly (i.e., non-moveably) connected together.

The first turbine component 234 and the second turbine component 236 are formed separately, and then non-moveably, coaxially assembled together so as to form the turbine assembly 222. Specifically, the second turbine shell member 246 of the second turbine component 236 non-moveably engages the first turbine component 234 by appropriate means known in the art, such as adhesive bonding, ultrasonic welding, friction welding, etc. The second turbine shell member 246 of the second turbine component 236 non-moveably engages the first turbine shell member 238 of the first turbine component 234 so as to define together the turbine shell 230 of the turbine assembly 222. As best illustrated in FIGS. 13, 20 and 21, each of the first turbine blade members 240 is oriented adjacent to one of the second turbine blade members 248 so as to define together the turbine blades 232 of the turbine assembly 222.

According to the present embodiment, the first and second turbine components 234 and 236, respectively, are made by casting of aluminum or magnesium alloys or, preferably, by molding polymeric material. In other words, the first turbine component 234 and the second turbine component 236 could be made of the same or different materials. Preferably, the first and second turbine components 234 and 236, respectively, are made by injection molding a polymeric material.

Moreover, as best shown in FIGS. 13, 16 and 21, the first turbine component 234 and the second turbine component 236 have a variable thickness. In fact, both the first turbine shell member 238 and the first turbine blade members 240 of the first turbine component 234 have a variable thickness, as best shown in FIGS. 13, 16 and 21. Similarly, both the second turbine shell member 246 and the second turbine blade members 248 of the second turbine component 236 have a variable thickness, as best shown in FIGS. 13, 16 and 21. Accordingly, the molded turbine assembly 222 can have variations in thickness, and be formed in a very particular form and shape. Also, the molded turbine assembly can have reinforcing ribs. Thus, with the molded turbine assembly of the present invention there is a possibility for mass optimization by putting the polymer/thickness where it is needed for strength and reducing the polymer/thickness where it is not needed, such as where stress and deformation are low.

A method for making the turbine assembly 222 is as follows. First, the steel grommets 250 are provided. Each of the grommets 250 has the cylindrical portion 252, the retainer elements 254 extending axially outwardly from the cylindrical portion 252, and the annular flange 256. Then, the first turbine component 234 and the second turbine component 236 of the turbine assembly 222 are formed separately from each other by injection molding the polymeric material. Next, as illustrated in FIG. 15, the retainer elements 254 of the grommets 250 are inserted into the mounting holes 245 through the mounting portion 244 of the first turbine shell member 238, until the annular flanges 256 engage the mounting portion 244 so that the retainer elements 254 extend out of the mounting portion 244, as best shown in FIGS. 16 and 17. Then, a grommet installation tool, known in the art, is employed to deform the retainer elements 254 of the grommets 250 radially outwardly from the distal end of each cylindrical portion 252 of associated grommet 250 substantially parallel to the annular flange 256 so that the mounting portion 244 of the first turbine shell member 238 is sandwiched between the retainer elements 254 and the annular flanges 256 of the grommet 250, as shown in FIGS. 14, 19, 20 and 22.

Then, the second turbine shell member 246 of the second turbine component 236 is axially aligned with and non-moveably secured to the first turbine shell member 238 of the first turbine component 234 by appropriate means known in the art, such as adhesive bonding, ultrasonic welding, friction welding, etc., so as to define together the turbine assembly 222.

A method for assembling the hydrokinetic torque-coupling device 210 is as follows. First, the impeller assembly 20, the stator 24, and the damper assembly 16 may each be preassembled. The impeller assembly 20 is formed by stamping steel blanks. The stator 24 is made by injection molding a polymeric material. The turbine assembly 222 is assembled as described above. The impeller assembly 20, the turbine assembly 222 and the stator 24 subassemblies are assembled together so as to form the torque converter 214. The damper assembly 16 and the turbine hub 28 are then added. Next, the turbine shell 230 of the turbine assembly 222 is non-movably (i.e., fixedly) secured to the turbine hub 28 and the output member 68 of the torsional vibration damper 16 by appropriate means, such as by rivets 27 or threaded fasteners extending through the mounting holes 245 in the mounting portion 244 of the first turbine shell member 238, the turbine hub 28 and the output member 68 of the torsional vibration damper 16, as illustrated in FIG. 13. More specifically, each of the rivets 27 axially extends through the opening 251 in one of the grommets 250 secured to the turbine shell 230. Then, the first casing shell 17 is non-moveably and sealingly secured, such as by welding at 19, to the second casing shell 18, as best shown in FIG. 13.

In a hydrokinetic torque-coupling device 310 of a fourth exemplary embodiment illustrated in FIGS. 23-32, the turbine assembly 222 is replaced by a turbine assembly 322.

The hydrokinetic torque coupling device 310 of FIGS. 23-32 corresponds substantially to the hydrokinetic torque coupling device 210 of FIGS. 13-22, and only the turbine assembly 322, which is the primary difference, will therefore be explained in detail below.

The turbine assembly 322, as best shown in FIGS. 23 and 29-31, comprises a substantially annular, semi-toroidal (or concave) turbine shell 330 rotatable about the rotational axis X, and a plurality of turbine blades 332 fixedly (i.e., non-moveably) secured to the turbine shell 330 and outwardly extending from the turbine shell 330, so as to face the impeller blades 25 of the impeller assembly 20. The turbine shell 330 of the turbine assembly 322 is non-movably (i.e., fixedly) secured to the turbine hub 28 by appropriate means, such as by rivets 27 or threaded fasteners.

Figure 29:
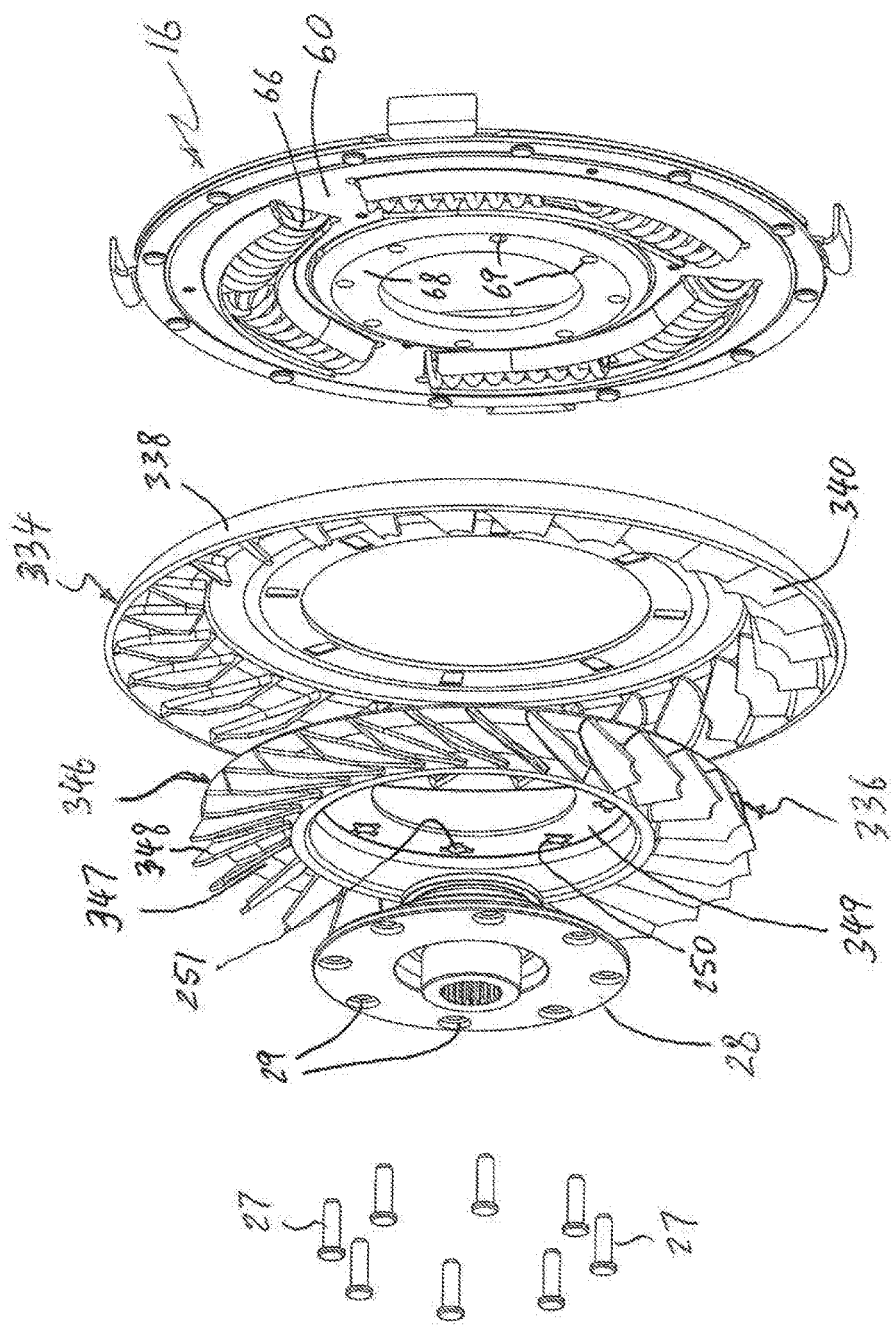
FIG. 29 is a front partial exploded perspective view of a turbine hub, a damper assembly and the turbine assembly in accordance with the fourth exemplary embodiment of the present invention.
Figure 30:
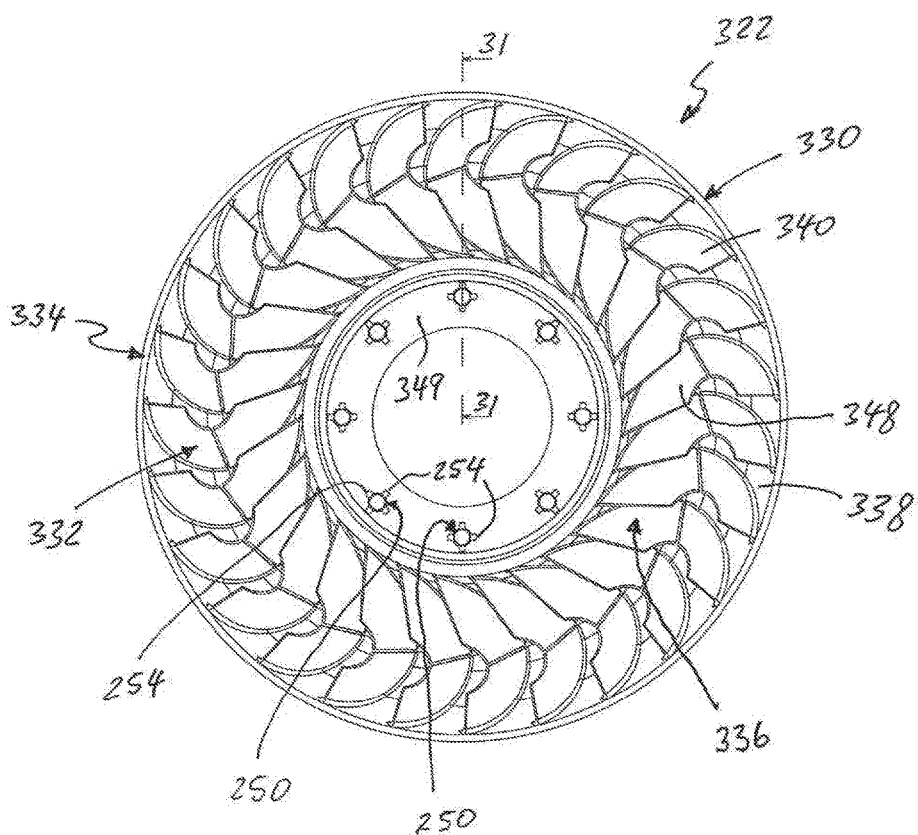
FIG. 30 is a front elevational view of the turbine assembly in accordance with the fourth exemplary embodiment of the present invention.
Figure 31:
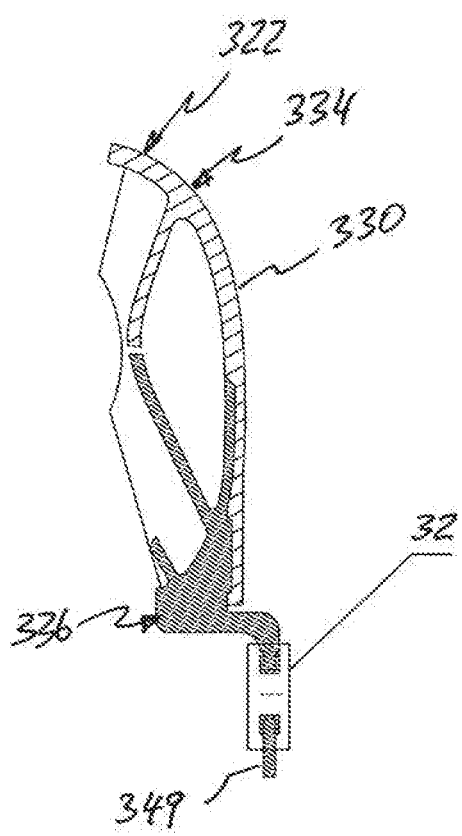
FIG. 31 is a partial sectional view the turbine assembly taken along the line 31-31 in FIG. 30.
Figure 32:
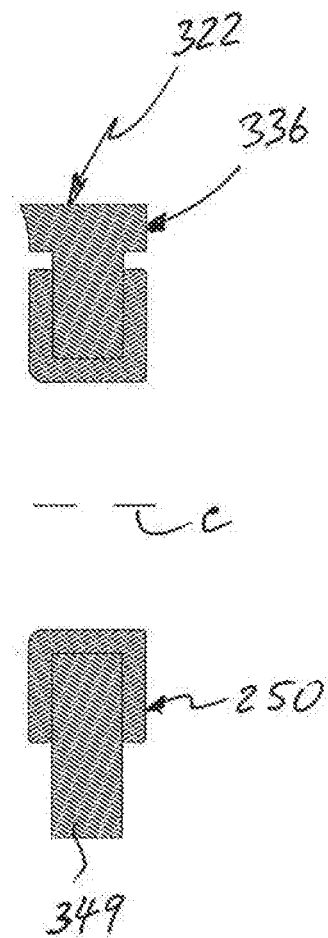
FIG. 32 is an enlarged view of a fragment of the turbine assembly shown in the rectangle "32" of FIG. 31.

Furthermore, the turbine assembly 322 comprises a first turbine component 334 rotatable about the rotational axis X, and a second turbine component 336 formed separately from and non-moveably secured to the first turbine component 334 coaxially therewith, as best shown in FIGS. 23 and 29-31. As illustrated in FIGS. 29 and 31, the first turbine component 334 includes a substantially annular first turbine shell member 338 and a plurality of first turbine blade members 340 integrally formed therewith and outwardly extending from the first turbine shell member 338 so as to face the impeller blades 25 of the impeller assembly 20. Preferably, the first turbine shell member 338 and the first turbine blade members 340 are made as a single or unitary (i.e., one-piece) component, but may be separate components fixedly (i.e., non-moveably) connected together.

Figure 25:
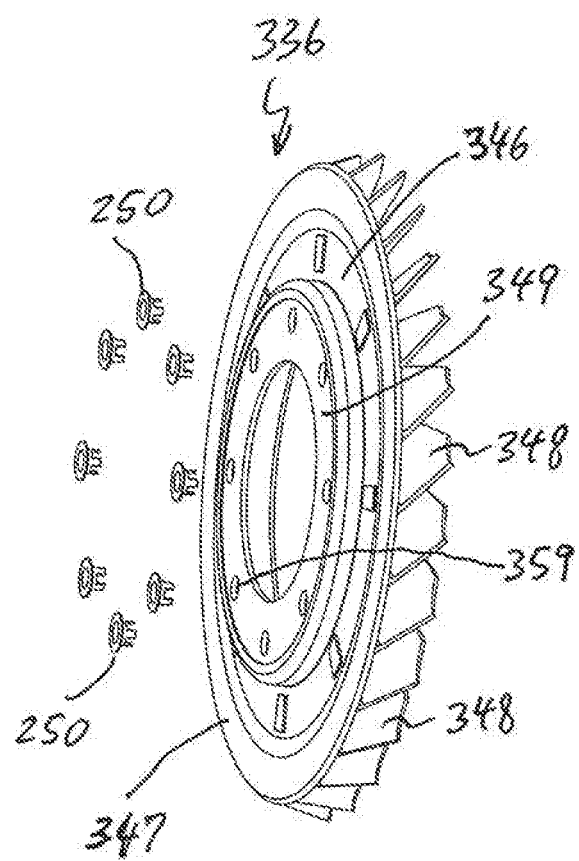
FIG. 25 is a rear perspective view of the second turbine component of the turbine assembly in accordance with the fourth exemplary embodiment of the present invention.
Figure 26:
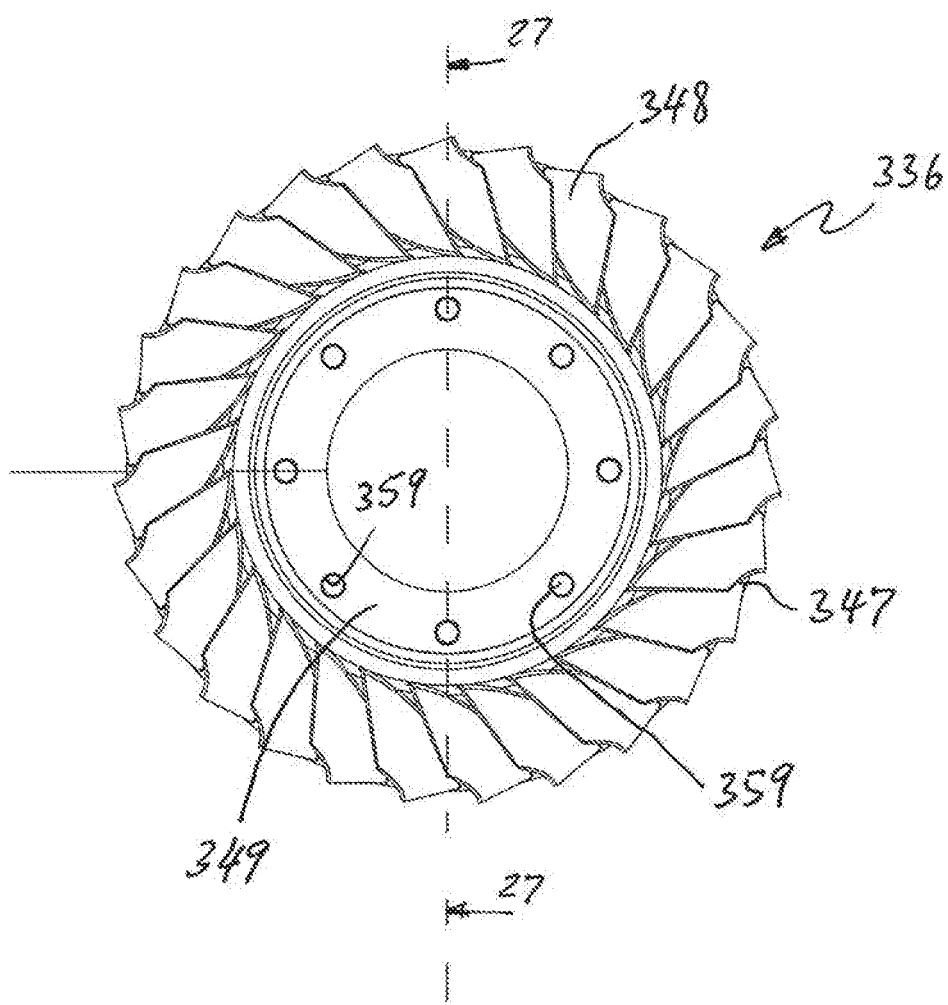
FIG. 26 is a front elevational view of the second turbine component of the turbine assembly in accordance with the fourth exemplary embodiment of the present invention.
Figure 27:
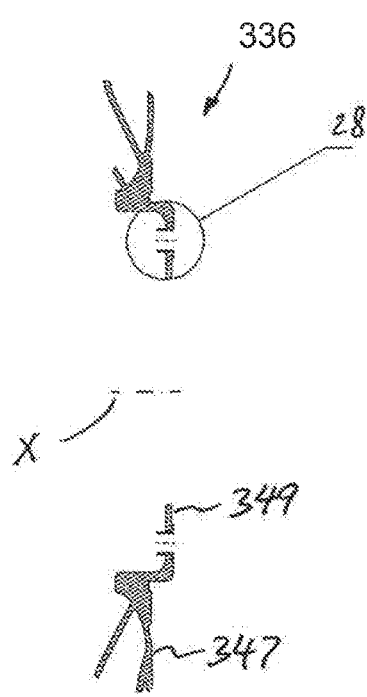
FIG. 27 is a partial sectional view the second turbine component taken along the line 27-27 in FIG. 26.

As further illustrated in FIGS. 25-27, the second turbine component 336 is formed separately from the first turbine component 334 and includes a substantially annular second turbine shell member 346, and a plurality of second turbine blade members 348 integrally formed therewith and outwardly extending from an annular, substantially semi-toroidal (i.e., concave) inner surface of the second turbine shell member 346 so as to face the impeller blades 25 of the impeller assembly 20. Preferably, the second turbine shell member 346 and the second turbine blade members 348 are made as a single or unitary (i.e., one-piece) component, but may be separate components fixedly (i.e., non-moveably) connected together.

The second turbine shell member 346 has a radially outer portion 347 and a substantially annular mounting portion 349 located radially within the radially outer portion 347 of the second turbine shell member 346. The second turbine blade members 348 are integrally formed with and outwardly extend from the radially outer portion 347 of the second turbine shell member 346. The mounting portion 349 of the second turbine shell member 346 is provided with a plurality of equiangular circumferentially spaced holes 359, as best shown in FIGS. 25 and 26. The second turbine shell member 346 is fixedly secured to the turbine hub 28 by the rivets 27 extending through the holes 359 in the mounting portion 349 of the second turbine shell member 346 of the second turbine component 336.

The holes 359 are circumferentially equiangularly spaced, as best shown in FIGS. 25 and 26, and configured to engage the rivets 27. As seen in FIGS. 23, 24 and 29-31, each of the holes 359 is circumscribed by a grommet 250. The grommets 250 are mounted to the mounting portion 349 of the second turbine shell member 346 around the holes 359 as reinforcements so that each of the rivets 27 axially extends through an opening 251 in one of the grommets 250 in order to non-movably (i.e., fixedly) secure the turbine shell 330 of the turbine assembly 322 to the turbine hub 28. Each of the grommets 250 includes a cylindrical portion 252, and an annular flange 256 extending radially outwardly from the proximal end of the cylindrical portion 252 of the grommet 250. The central axis C of the cylindrical portion 252 is substantially parallel to the rotational axis X, as best shown in FIGS. 24, 27, 28 and 32.

After securing the grommet 250 to the mounting portion 349 of the second turbine shell member 346, the retainer elements 254 extend radially outwardly from the distal end of the cylindrical portion 252 of the grommet 250 substantially parallel to the annular flange 256, as shown in FIGS. 23, 24 and 29-32.

As further shown in FIGS. 23, 24 and 29-32, the retainer elements 254 and the annular flange 256 of the grommet 250 in an assembled position (i.e., secured to the second turbine shell member 346) are axially spaced from each other, so as to provide a gap therebetween for receiving the mounting portion 349 of the second turbine shell member 346 around the holes 359. Thus, the mounting portion 349 of the second turbine shell member 346 is sandwiched between the retainer elements 254 and the annular flange 256 of the grommet 250 so that the retainer elements 254 and the annular flanges 256 engage axially opposite sides of the mounting portion 349 of the second turbine shell member 346.

The first turbine component 334 and the second turbine component 336 are formed separately, and then non-moveably, coaxially assembled together so as to form the turbine assembly 322, such as by adhesive bonding, ultrasonic welding, friction welding, etc. Preferably, the first and second turbine components 334 and 336, respectively, are made by injection molding a polymeric material. The second turbine component 336 is made separately from the grommets 250, and then the grommets 250 are secured (or fixed) to the second turbine component 336 around the holes 359 in the mounting portion 349 of the second turbine shell member 346.

Figure 28:
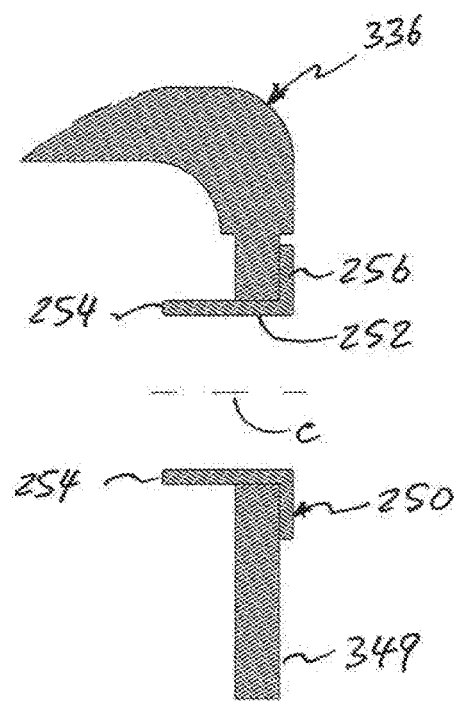
FIG. 28 is an enlarged view of a fragment of the hydrokinetic torque-coupling device shown in the circle "28" of FIG. 27.

A method for making the turbine assembly 322 is as follows. First, the steel grommets 250 are provided. Each of the grommets 250 has the cylindrical portion 252, the retainer elements 254 extending axially outwardly from the cylindrical portion 252, and the annular flange 256. Then, the first turbine component 334 and the second turbine component 336 of the turbine assembly 322 are formed separately from each other by injection molding the polymeric material. Next, as illustrated in FIG. 25, the retainer elements 254 of the grommets 250 are inserted into the holes 359 through the mounting portion 349 of the second turbine shell member 346, until the annular flanges 256 engage the mounting portion 349 so that the retainer elements 254 extend out of the mounting portion 349, as best shown in FIGS. 27 and 28. Then, a grommet installation tool, known in the art, is employed to deform the retainer elements 254 of each grommet 250 radially outwardly from the distal end of the cylindrical portion 252 of the grommet 250 substantially parallel to the annular flange 256, so that the retainer elements 254 and the annular flange 256 engage axially opposite sides of the mounting portion 349 of the second turbine shell member 346, as shown in FIGS. 23, 24 and 29-31.

Then, the second turbine shell member 346 of the second turbine component 336 is axially aligned and non-moveably secured to the first turbine shell member 338 of the first turbine component 334 by appropriate means known in the art, such as adhesive bonding, ultrasonic welding, friction welding, etc., so as to define together the turbine assembly 322.

Figure 18:
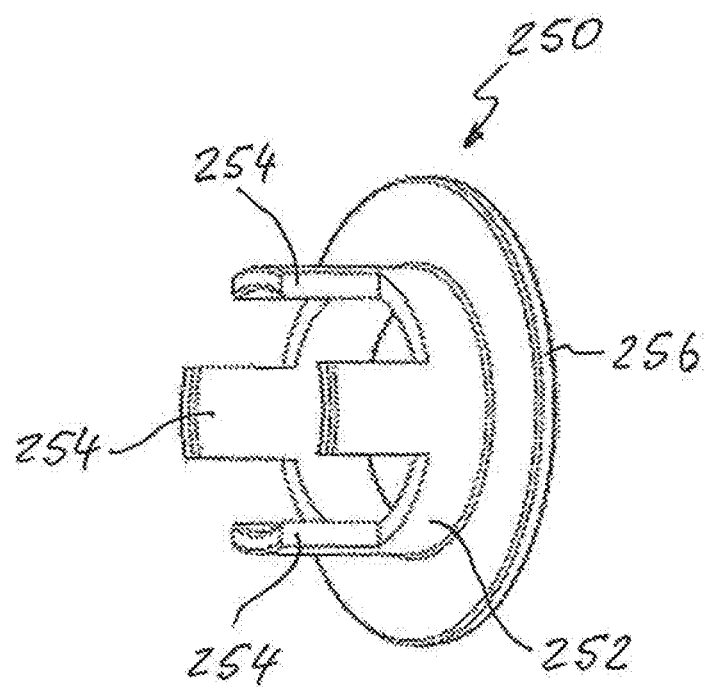
FIG. 18 is an enlarged perspective view of a grommet in accordance with the third exemplary embodiment of the present invention.
Figure 23:
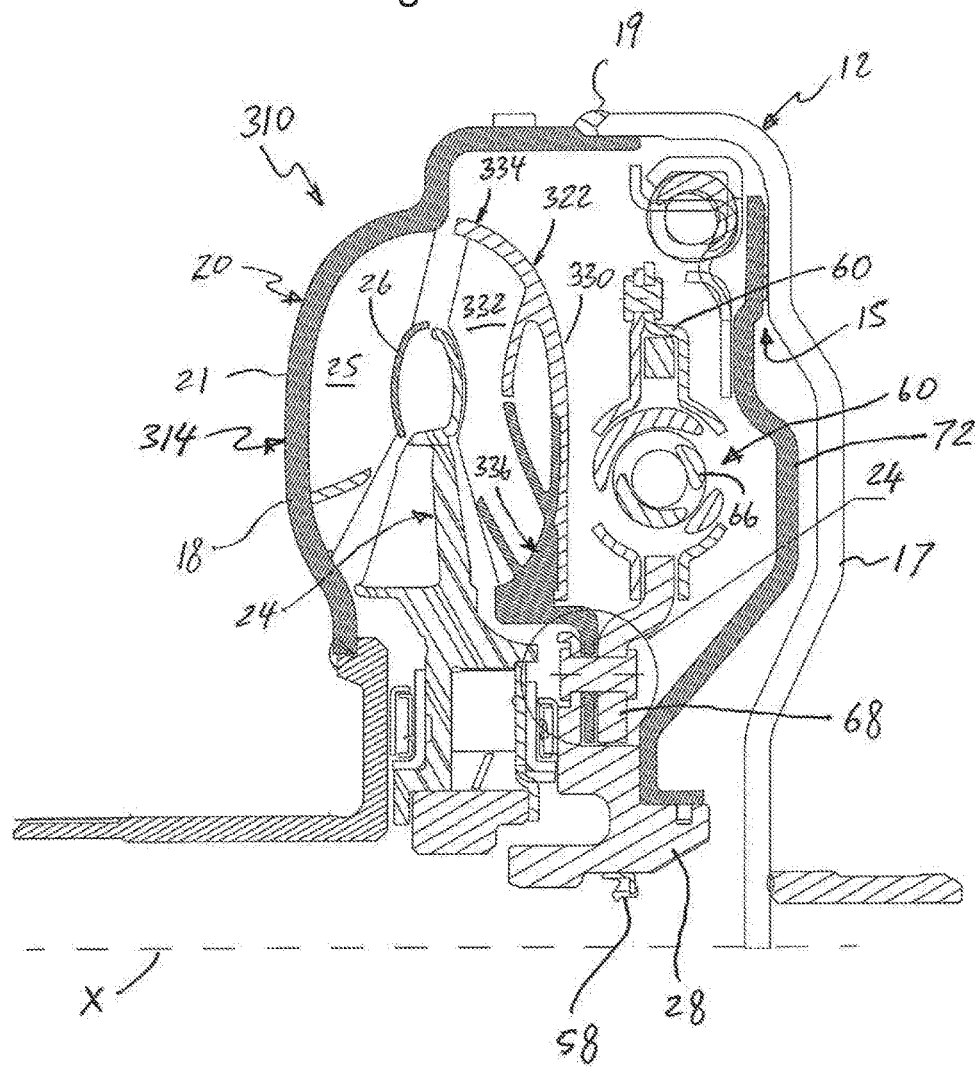
FIG. 23 is a fragmented half-view in axial section of a torque-coupling device with a turbine assembly in accordance with a fourth exemplary embodiment of the present invention.
Figure 24:
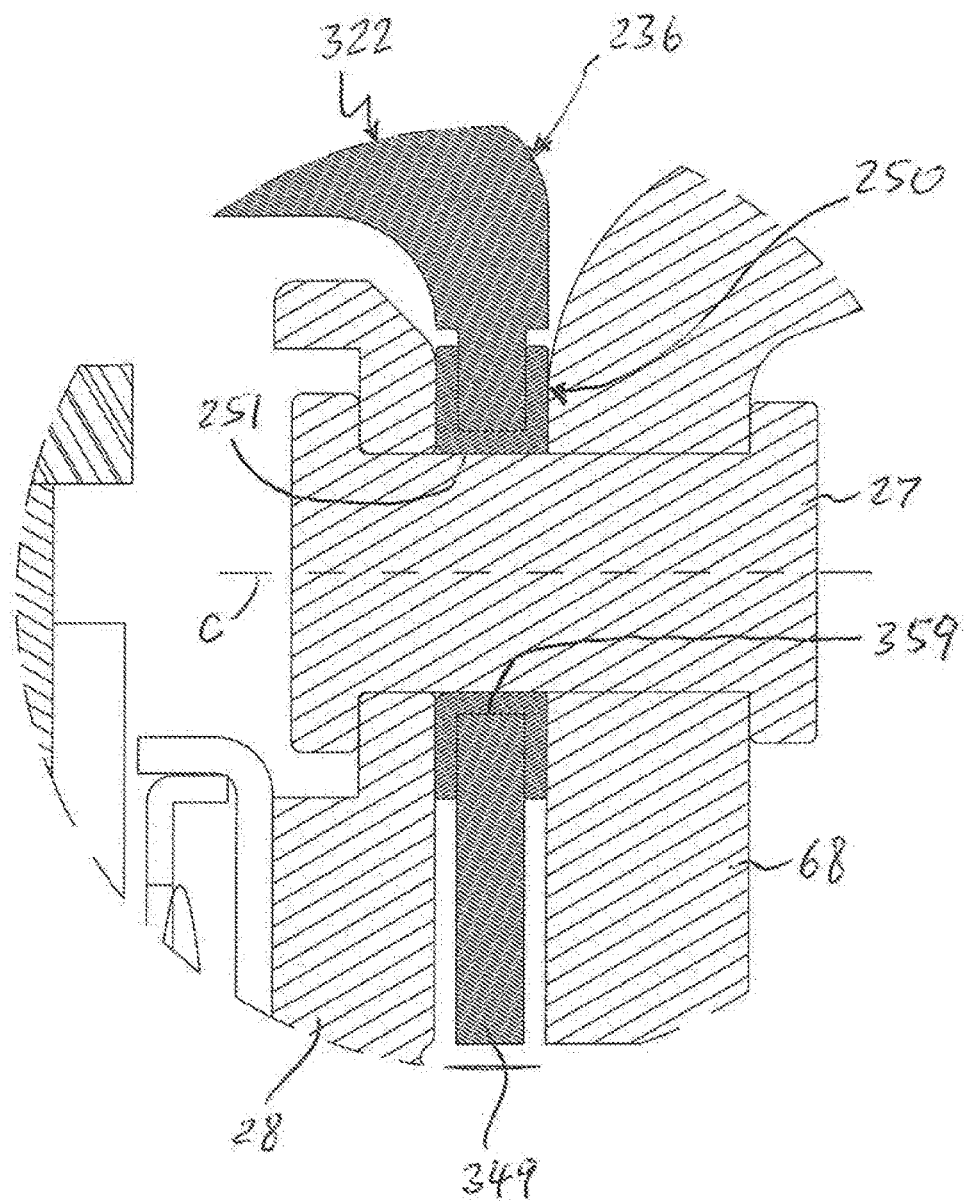
FIG. 24 is an enlarged view of a fragment of the hydrokinetic torque-coupling device shown in the circle "24" of FIG. 23.

A method for assembling the hydrokinetic torque-coupling device 310 is as follows. First, the impeller assembly 20, the stator 24, and the damper assembly 16 may each be preassembled. The impeller assembly 20 is formed by stamping steel blanks. The stator 24 is made by injection molding a polymeric material. The turbine assembly 322 is assembled as described above. The impeller assembly 20, the turbine assembly 322 and the stator 24 subassemblies are assembled together so as to form the torque converter 314. The damper assembly 16 and the turbine hub 28 are then added. Next, the turbine shell 330 of the turbine assembly 322 is non-movably (i.e., fixedly) secured to the turbine hub 28 and the output member 68 of the torsional vibration damper 16 by appropriate means, such as by rivets 27 or threaded fasteners extending through the holes 359 in the mounting portion 349 of the second turbine shell member 346, the turbine hub 28 and the output member 68 of the torsional vibration damper 16, as illustrated in FIG. 23. More specifically, each of the rivets 27 axially extends through the opening 251 in one of the grommets 250 secured to the turbine shell 330. Then, the first casing shell 17 is non-moveably and sealingly secured, such as by welding at 19, to the second casing shell 18, as best shown in FIG. 18.

In a hydrokinetic torque-coupling device 410 of a fifth exemplary embodiment illustrated in FIGS. 33-40, the turbine assembly 222 is replaced by a turbine assembly 422. The hydrokinetic torque coupling device 410 of FIGS. 33-40 corresponds substantially to the hydrokinetic torque coupling device 210 of FIGS. 13-22, and only the turbine assembly 422, which is the primary difference, will therefore be explained in detail below.

The turbine assembly 422, as best shown in FIGS. 33 and 29-31, comprises a substantially annular, semi-toroidal (or concave) turbine shell 430 rotatable about the rotational axis X, and a plurality of turbine blades 432 fixedly (i.e., non-moveably) secured to the turbine shell 430 and outwardly extending from the turbine shell 430 so as to face the impeller blades 25 of the impeller assembly 20. The turbine shell 430 of the turbine assembly 422 is non-movably (i.e., fixedly) secured to the turbine hub 28 by appropriate means, such as by rivets 27 or threaded fasteners.

The turbine assembly 422 comprises a first turbine component 434 rotatable about the rotational axis X, and a second turbine component 436 formed separately from and non-moveably secured to the first turbine component 434 coaxially therewith, as best shown in FIGS. 33, 36, 38 and 39. The first turbine component 434 is similar to the first turbine component 234 according to the third exemplary embodiment, while the second turbine component 436 is similar to the second turbine component 336 according to the fourth exemplary embodiment of the present invention.

As illustrated in FIGS. 35A, 35C, 38 and 39, the first turbine component 434 includes a substantially annular first turbine shell member 438 and a plurality of first turbine blade members 440 integrally formed therewith, and outwardly extending from the first turbine shell member 438 so as to face the impeller blades 25 of the impeller assembly 20. Preferably, the first turbine shell member 438 and the first turbine blade members 440 are made as a single or unitary (i.e., one-piece) component, but may be separate components fixedly (i.e., non-moveably) connected together. The first turbine shell member 238 has a substantially semi-toroidal radially outer portion 442 and a substantially annular mounting portion 444 located radially within the radially outer portion 442 of the first turbine shell member 438. The mounting portion 444 of the first turbine shell member 438 is provided with a plurality of equiangular circumferentially spaced through holes 445, as best shown in FIGS. 35A, 35C, 36 and 40.

As further illustrated in FIGS. 35B, 35C, 38 and 39, the second turbine component 436 includes a substantially annular second turbine shell member 446, and a plurality of second turbine blade members 448 integrally formed therewith and outwardly extending from an annular, substantially semi-toroidal (i.e., concave) inner surface of the second turbine shell member 446, so as to face the impeller blades 25 of the impeller assembly 20. Preferably, the second turbine shell member 446 and the second turbine blade members 448 are made as a single or unitary (i.e., one-piece) component, but may be separate components fixedly (i.e., non-moveably) connected together.

The second turbine shell member 446 has a radially outer portion 447 and a substantially annular mounting portion 449 located radially within the radially outer portion 447 of the second turbine shell member 446. The second turbine blade members 448 are integrally formed with and outwardly extend from the radially outer portion 447 of the second turbine shell member 446. The mounting portion 449 of the second turbine shell member 446 is provided with a plurality of equiangular circumferentially spaced through holes 459, as best shown in FIGS. 35B, 35C, 36 and 40.

The first and second turbine components 434 and 436, respectively, are fixedly secured to the turbine hub 28 by the rivets 27 extending through the holes 445 and 459 in the mounting portions 444 and 449 of the first and second turbine shell members 438 and 446 of the first and second turbine components 434 and 436, respectively. The first and second turbine components 434 and 436 are coaxially aligned with one another and the rotational axis X, so that the holes 445 of the first turbine component 434 are axially and radially aligned (or registered) with the corresponding holes 459 of the second turbine component 436. In other words, each of the holes 445 of the first turbine component 434 has the same central axis as corresponding one of the holes 459 of the second turbine component 436.

As further shown in FIGS. 33, 34, 39 and 40, each pair of the aligned holes 445, 459 is circumscribed by a grommet 450. The grommets 450 are mounted to the mounting portions 444 and 449 of the first and second turbine shell members 438 and 446 of the first and second turbine components 434 and 436, respectively, around the aligned holes 445, 459 as a reinforcement, so that each of the rivets 27 axially extends through an opening 451 in one of the grommets 450 in order to non-movably (i.e., fixedly) secure the turbine shell 430 of the turbine assembly 422 to the turbine hub 28.

Figure 34:
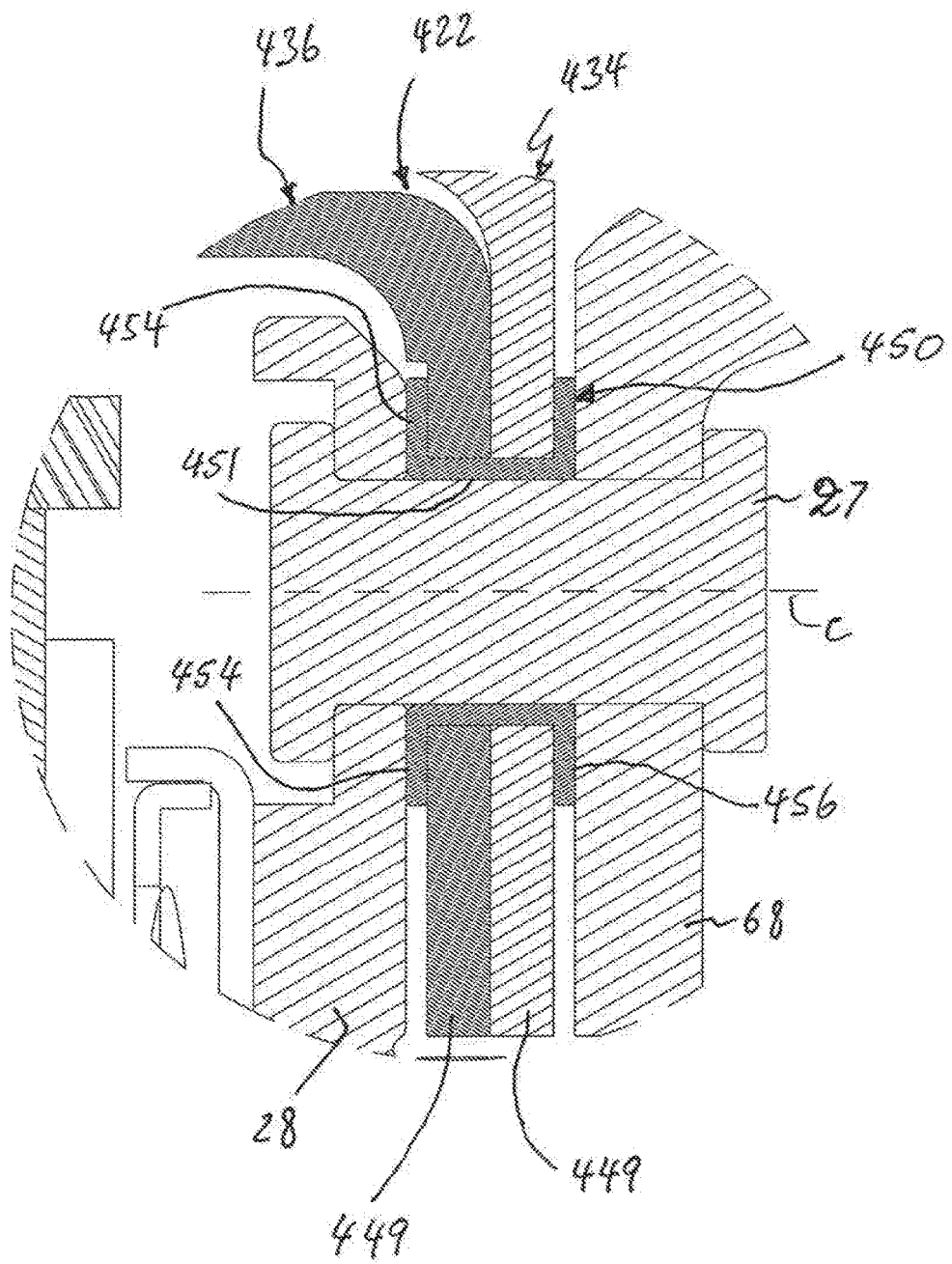
FIG. 34 is an enlarged view of a fragment of the hydrokinetic torque-coupling device shown in the circle "34" of FIG. 33.
Figure 39:
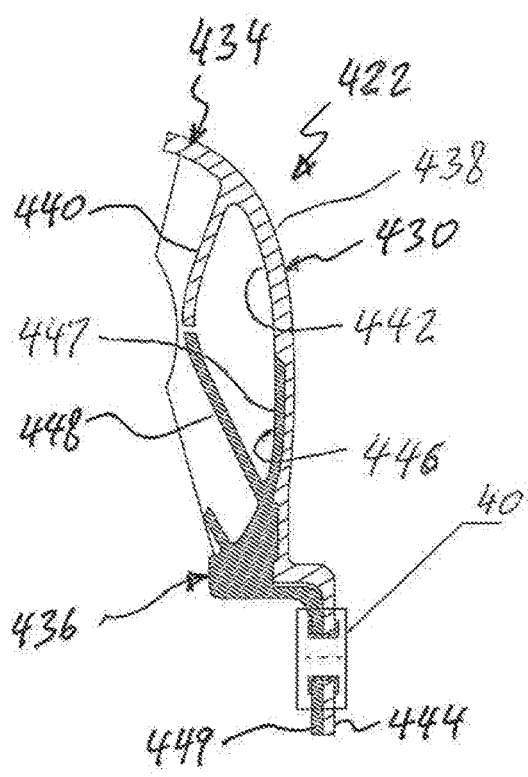
FIG. 39 is a partial sectional view the turbine assembly taken along the line 39-39 in FIG. 38.
Figure 40:
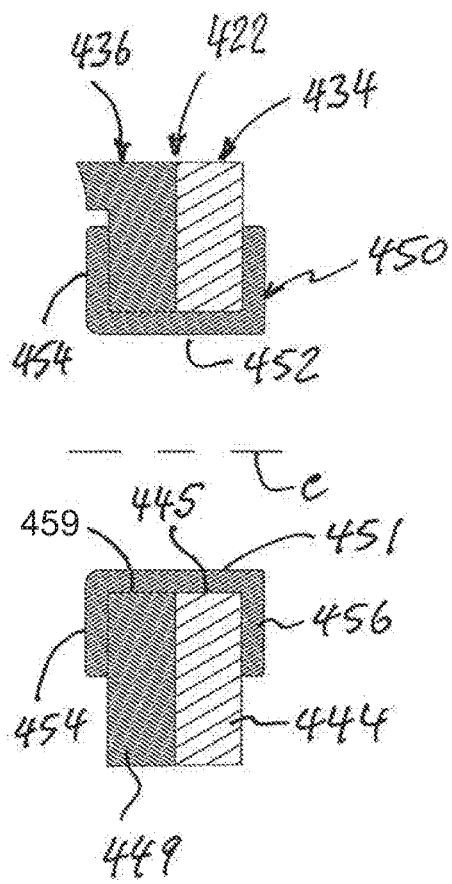
FIG. 40 is an enlarged view of a fragment of the turbine assembly shown in the rectangle "40" of FIG. 39.

Each of the grommets 450 includes a cylindrical portion 452, and an annular flange 456 extending radially outwardly from a proximal (or first) end of the cylindrical portion 452 of the grommet 450. A central axis C of the cylindrical portion 452 is substantially parallel to the rotational axis X, as best shown in FIGS. 34, 39 and 40.

Figure 35A:
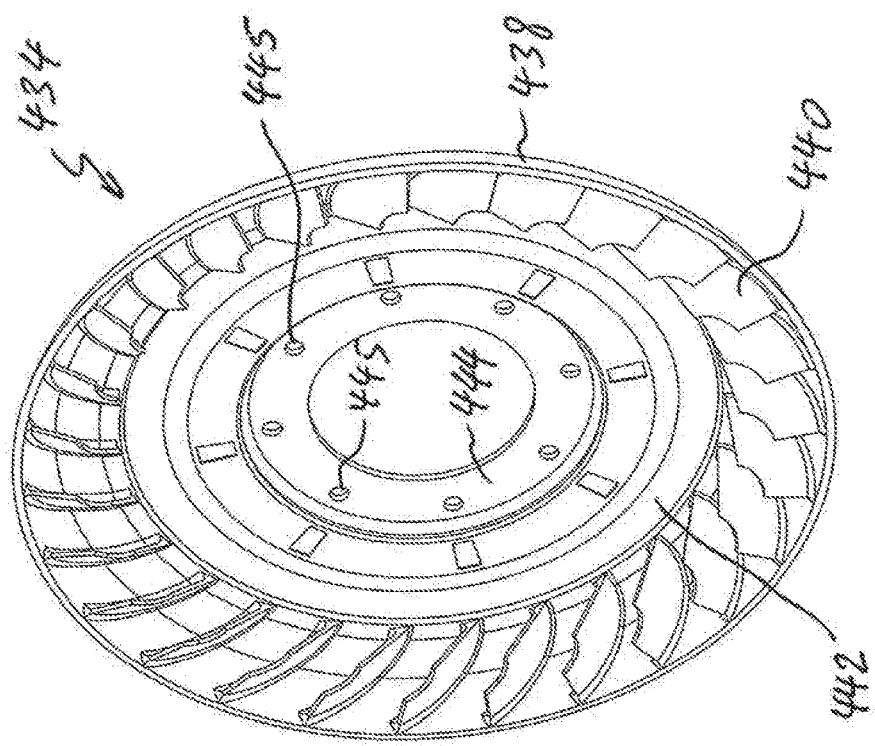
FIG. 35A is a front perspective view of a first turbine component of a turbine assembly in accordance with the fifth exemplary embodiment of the present invention.
Figure 35B:
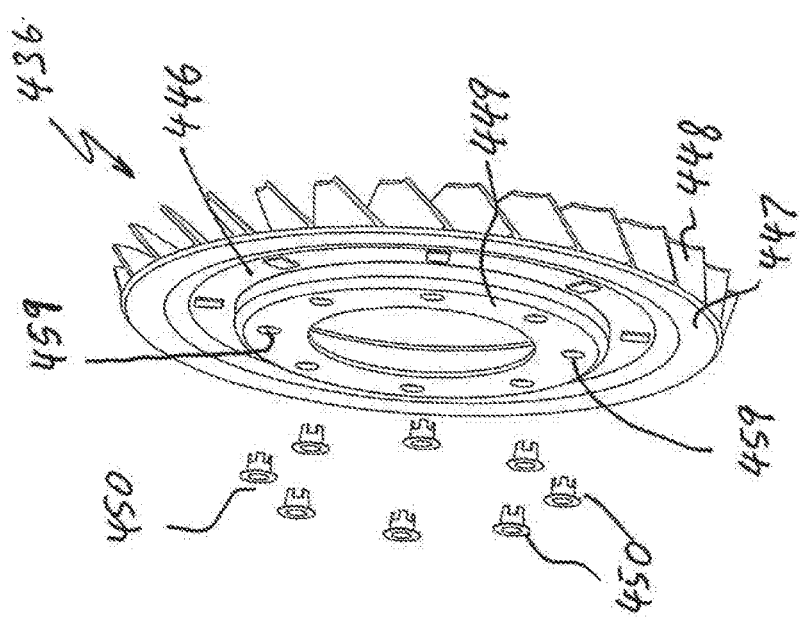
FIG. 35B is a rear perspective view of a second turbine component of the turbine assembly in accordance with the fifth exemplary embodiment of the present invention.
Figure 35C:
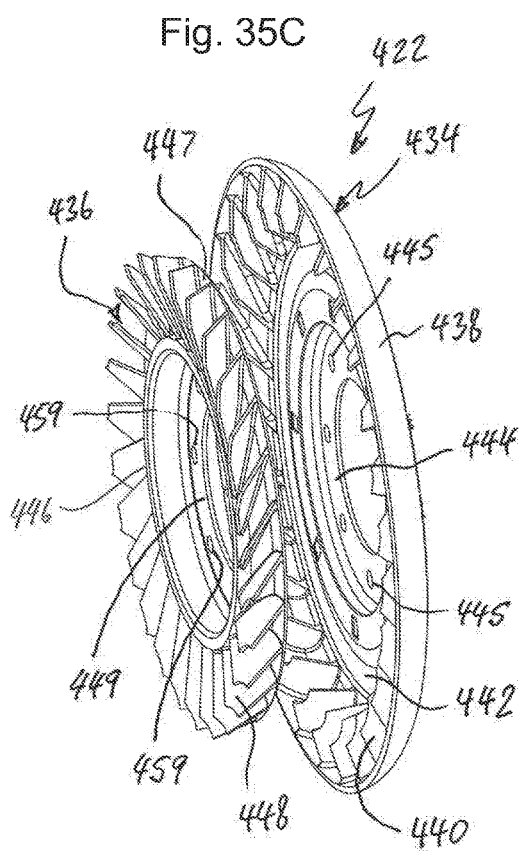
FIG. 35C is a front partial exploded perspective view of the turbine assembly in accordance with the fifth exemplary embodiment of the present invention.
Figure 36:
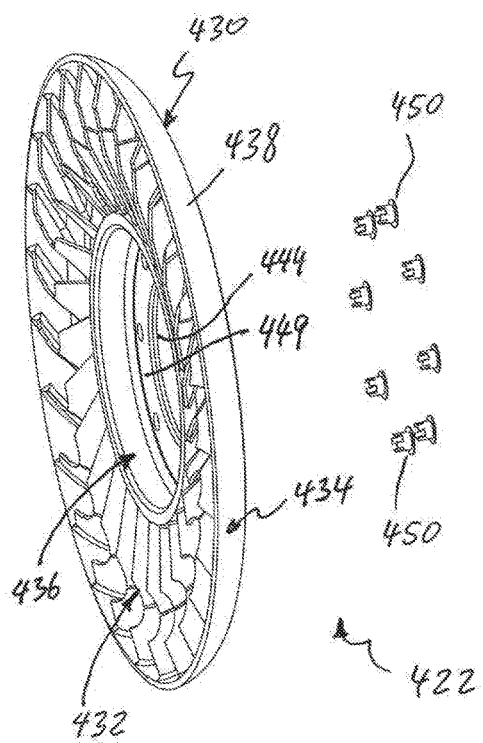
FIG. 36 is a front perspective view of the turbine assembly in accordance with the fifth exemplary embodiment of the present invention.
Figure 37:
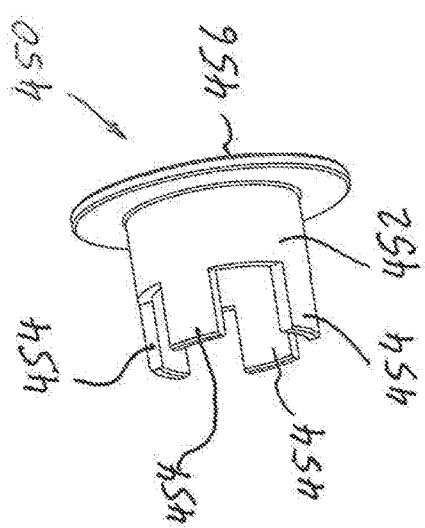
FIG. 37 is an enlarged perspective view of a grommet in accordance with the fifth exemplary embodiment of the present invention.

A distal (or second) end of the cylindrical portion 452 is provided with one or more retainer elements 454, which initially, before securing to the mounting portions 444 and 449 of the first and second turbine shell members 438 and 446, respectively, extends axially from the cylindrical portion 452 in the direction parallel to the central axis C, as shown in FIGS. 35B, 36 and 37. However, after securing the grommet 450 to the mounting portions 444 and 449 of the first and second turbine shell members 438 and 446, the retainer elements 454 extend radially outwardly from the distal end of the cylindrical portions 452 of the grommets 450 substantially parallel to the annular flange 456, as shown in FIGS. 34 and 40. Also, each of the grommets 450 has the through opening 451 therein defined by the cylindrical portion 452 of the grommet 450.

As further shown in FIGS. 33, 34, 39 and 40, the retainer elements 454 and the annular flange 456 of the grommet 450 in an assembled position (i.e., secured to the first and second turbine shell members 438 and 446) are axially spaced from each other, so as to provide a gap therebetween for receiving the mounting portions 444 and 449 of the first and second turbine shell members 438 and 446 around the aligned holes 445 and 459. Thus, the mounting portions 444 and 449 of the first and second turbine shell members 438 and 446 are sandwiched between the retainer elements 454 and the annular flanges 456 of the grommets 450. In other words, the annular flanges 456 of the grommets 450 engage the mounting portion 444 of the first turbine shell member 438, while the axially opposite retainer elements 454 of the grommets 450 engage the mounting portion 449 of the second turbine shell member 446. The grommets 450 may be made of a rigid material, such as metal, plastic or polymer. According to the exemplary embodiment of the present invention the grommets 450 are made of steel, such as SAE 1020 carbon steel, which has a good combination of strength and ductility and may be hardened or carburized, and is readily cold worked by conventional methods.

The first and second turbine shell members 438 and 446 are fixedly secured to the turbine hub 28 and the output member 68 of the torsional vibration damper 16 by rivets 27 extending through the aligned holes 445 and 459 in the mounting portions 444 and 449 of the first and second turbine shell members 438 and 446, respectively, and the holes 69 of the output member 68 of the torsional vibration damper 16. The impeller assembly 20, the turbine assembly 422, and the stator assembly 24 are coaxially aligned with one another and the rotational axis X.

Figure 38:
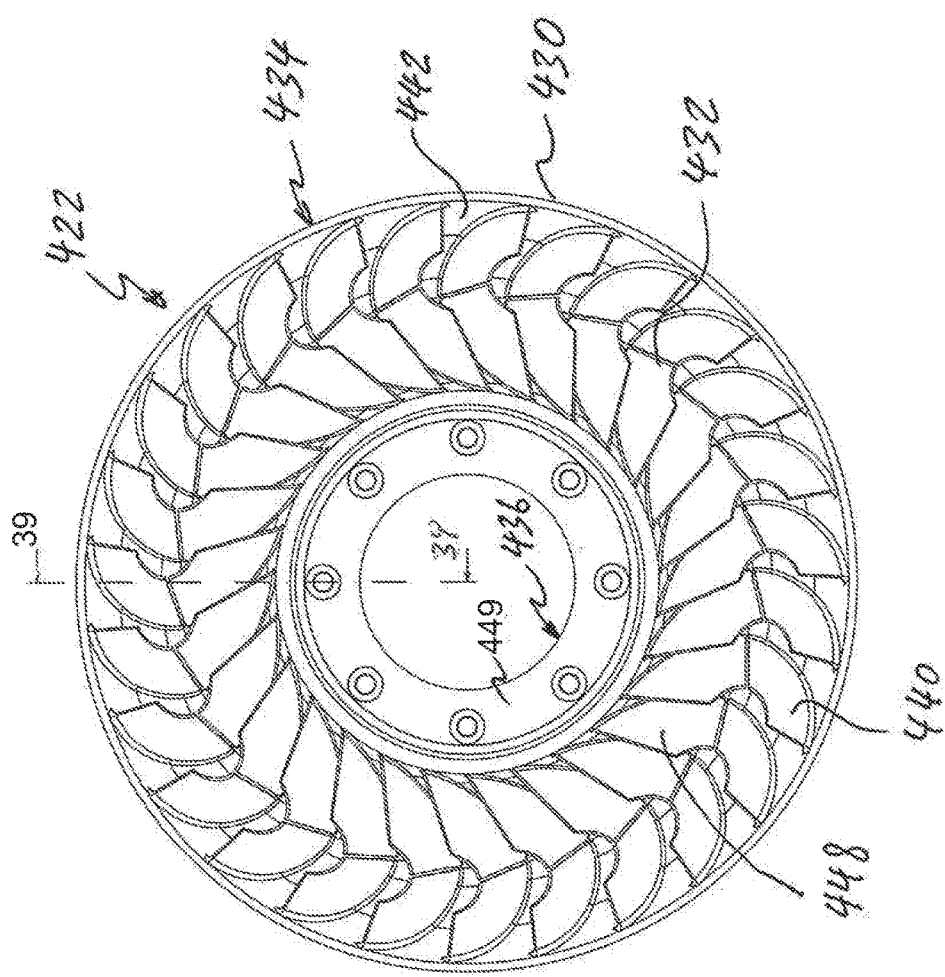
FIG. 38 is a front elevational view of the turbine assembly in accordance with the fifth exemplary embodiment of the present invention.

The first turbine component 434 and the second turbine component 436 are formed separately, and then non-moveably, coaxially assembled together so as to form the turbine assembly 422. Specifically, the second turbine shell member 446 of the second turbine component 436 non-moveably engages the first turbine component 434 by appropriate means known in the art, such as adhesive bonding, ultrasonic welding, friction welding, etc. Then the grommets 450 are secured (or fixed) to the first and second turbine components 434 and 436 around the holes 445 and 459 in the mounting portions 444 and 449 of the first and second turbine shell members 438 and 446, respectively. The second turbine shell member 446 of the second turbine component 436 non-moveably engages the first turbine shell member 438 of the first turbine component 434, so as to define together the turbine shell 430 of the turbine assembly 422. As best illustrated in FIGS. 36, 38 and 39, each of the first turbine blade members 440 is oriented adjacent to one of the second turbine blade members 448 so as to define together the turbine blades 432 of the turbine assembly 422.

According to the present embodiment, the first and second turbine components 434 and 436, respectively, are made by casting of aluminum or magnesium alloys or, preferably, by molding polymeric material. In other words, the first turbine component 434 and the second turbine component 436 could be made of the same or different materials. Preferably, the first and second turbine components 434 and 436, respectively, are made by injection molding a polymeric material.

A method for making the turbine assembly 422 is as follows. First, the steel grommets 450 are provided. Each of the grommets 450 has the cylindrical portion 452, the retainer elements 454 extending axially outwardly from the cylindrical portion 452, and the annular flange 456. Then, the first turbine component 434 and the second turbine component 436 of the turbine assembly 422 are formed separately from each other by injection molding the polymeric material.

Next, the second turbine shell member 446 of the second turbine component 436 is axially aligned with and non-moveably secured to the first turbine shell member 438 of the first turbine component 434 by appropriate means known in the art, such as adhesive bonding, ultrasonic welding, friction welding, etc., so as to define together the turbine assembly 422.

Then, as illustrated in FIG. 36, the retainer elements 454 of the grommets 450 are inserted into the holes 445 and 459 in the mounting portions 444 and 449 of the first and second turbine shell members 438 and 446, respectively, until the annular flanges 456 engage the mounting portion 444, so that the retainer elements 454 extend out of the mounting portions 449 of the second turbine shell member 446. Then, a grommet installation tool, known in the art, is employed to deform the retainer elements 454 of the grommets 450 radially outwardly from the distal end of the cylindrical portion 452 of the grommet 450 substantially parallel to the annular flange 456, so that the mounting portions 444 and 449 of the first and second turbine shell members 438 and 446 are sandwiched between the retainer elements 454 and the annular flanges 456 of the grommet 450. In other words, the annular flanges 456 of the grommets 450 engage the mounting portion 444 of the first turbine shell member 438, while the axially opposite retainer elements 454 of the grommets 450 engage the mounting portion 449 of the second turbine shell member 446, as shown in FIGS. 34 and 40.

Figure 33:
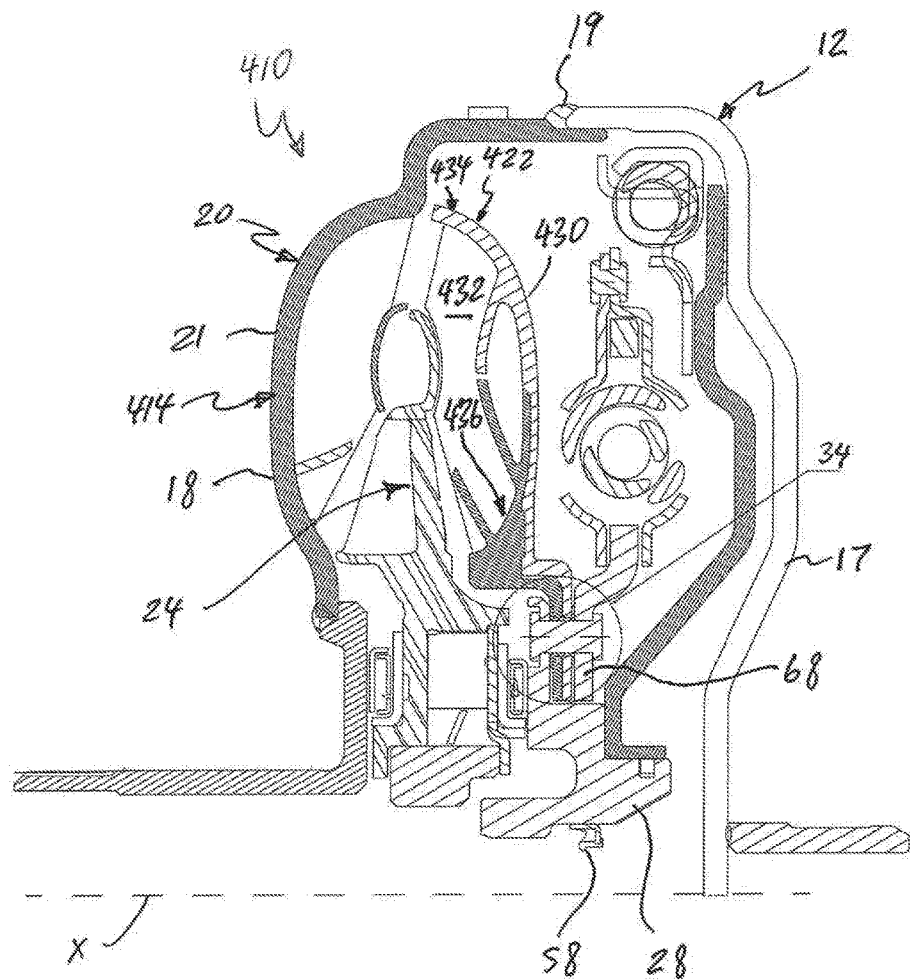
FIG. 33 is a fragmented half-view in axial section of a torque-coupling device with a turbine assembly in accordance with a fifth exemplary embodiment of the present invention.

A method for assembling the hydrokinetic torque-coupling device 410 is as follows. First, the impeller assembly 20, the stator 24, and the damper assembly 16 may each be preassembled. The impeller assembly 20 is formed by stamping steel blanks. The stator 24 is made by injection molding a polymeric material. The turbine assembly 422 is assembled as described above. The impeller assembly 20, the turbine assembly 422 and the stator 24 subassemblies are assembled together so as to form the torque converter 414. The damper assembly 16 and the turbine hub 28 are then added. Next, the turbine shell 430 of the turbine assembly 422 is non-movably (i.e., fixedly) secured to the turbine hub 28 and the output member 68 of the torsional vibration damper 16 by appropriate means, such as by rivets 27 or threaded fasteners extending through the holes 445 and 459 in the mounting portions 444 and 449 of the first and second turbine shell members 438 and 446, respectively, the turbine hub 28 and the holes 69 in the output member 68 of the torsional vibration damper 16, as illustrated in FIG. 33. More specifically, each of the rivets 27 axially extends through the opening 451 in one of the grommets 450 secured to the turbine shell 430. Then, the first casing shell 17 is non-moveably and sealingly secured, such as by welding at 19, to the second casing shell 18, as best shown in FIG. 33.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A turbine assembly for a hydrokinetic torque converter, the turbine assembly rotatable about a rotational axis and comprising:
   a first turbine component coaxial with the rotational axis, the first turbine component having a plurality of first turbine blade members integrally formed therewith;
   a second turbine component formed separately from and non-moveably secured to the first turbine component coaxially therewith;
   one of the first and second turbine components having a substantially annular mounting portion provided with a plurality of mounting holes; and
   a plurality of grommets, each grommet mounted in one of the mounting holes;
   each of the grommets including a cylindrical portion and two axially opposite annular flanges extending radially outwardly from the cylindrical portion and axially spaced so as to sandwich the mounting portion of an associated one of the first and second turbine components therebetween.

2. The turbine assembly as defined in claim 1, wherein the second turbine component has a plurality of second turbine blade members integrally formed therewith.

3. The turbine assembly as defined in claim 2, wherein each of the first turbine blade members is oriented adjacent to one of the second turbine blade members so as to define together a turbine blade of the turbine assembly.

4. The turbine assembly as defined in claim 1, wherein a central axis of the cylindrical portion of each of the grommets is substantially parallel to the rotational axis.

5. The turbine assembly as defined in claim 1, wherein the first turbine component has the annular mounting portion provided with the mounting holes, and wherein each of the grommets is mounted in one of the mounting holes through the mounting portion of the first turbine component.

6. A hydrokinetic torque-coupling device, comprising:
   an impeller assembly rotatable about a rotational axis;
   a turbine assembly rotatable about the rotational axis and disposed axially opposite to the impeller assembly;
   a turbine hub non-moveably secured to the turbine assembly; and
   fasteners non-moveably securing the turbine hub to the turbine assembly;
   the turbine assembly coaxially aligned with and hydrodynamically drivable by the impeller assembly, the turbine assembly comprising:
   a first turbine component coaxial with the rotational axis, the first turbine component having a plurality of first turbine blade members integrally formed therewith;
   a second turbine component formed separately from and non-moveably secured to the first turbine component and coaxial therewith;

one of the first and second turbine components has a substantially annular mounting portion provided with a plurality of mounting holes; and a plurality of grommets, each grommet mounted in one of the mounting holes;

each of the fasteners extends through one of the grommets and the turbine hub so as to non-moveably secure the turbine hub to the turbine assembly.

7. The hydrokinetic torque-coupling device as defined in claim 6, further comprising a torsional vibration damper comprising an input member, circumferentially acting elastic members, and an output member elastically coupled to the input member through the elastic members; and wherein the output member of the torsional vibration damper is non-rotatably connected to the turbine hub by the fasteners.

8. The hydrokinetic torque-coupling device as defined in claim 7, further comprising a lock-up clutch comprising a locking piston rotatably and axially moveably mounted to the turbine hub, and wherein the input member of the torsional vibration damper is operatively connected to the locking piston of the lock-up clutch.

9. The hydrokinetic torque-coupling device as defined in claim 6, wherein each of the grommets includes a cylindrical portion and two axially opposite annular flanges extending radially outwardly from the cylindrical portion and axially spaced apart so as to sandwich the mounting portion of an associated one of the first and second turbine components therebetween.

10. The hydrokinetic torque-coupling device as defined in claim 9, wherein a central axis of the cylindrical portion of each of the grommets is substantially parallel to the rotational axis.

11. The hydrokinetic torque-coupling device as defined in claim 6, wherein the first turbine component has the annular mounting portion provided with the mounting holes, and wherein each of the grommets is mounted in one of the mounting holes through the mounting portion of the first turbine component.

12. A method for making a turbine assembly of a hydrokinetic torque converter, the method comprising steps of:
providing a plurality of grommets, each of the grommets including a cylindrical portion and two axially opposite annular flanges extending radially outwardly from the cylindrical portion and axially spaced from each other;
molding a first turbine component, the first turbine component having a plurality of first turbine blade members integrally formed therewith;
molding a second turbine component, the second turbine component made separately from the first turbine component;
one of the first and second turbine components has a substantially annular mounting portion provided with a plurality of mounting holes;
mounting each of the grommets to one of the mounting holes in the mounting portion; and
non-moveably securing the first turbine component to the second turbine component;
the steps of molding one of the first and second turbine components having the mounting portion and mounting each of the grommets to one of the mounting holes in the mounting portion including the step of molding one of the first and second turbine components with the mounting portion from polymeric material integrally with the grommets by molding the polymeric material over and around the cylindrical portions of the grommets so as to sandwich the mounting portion of an associated one of the first and second turbine components between the two axially opposite annular flanges of the grommets.

13. A method for making a hydrokinetic torque-coupling device, the method comprising steps of:
providing an impeller assembly;
providing a plurality of grommets;
molding a first turbine component, the first turbine component having a plurality of first turbine blade members integrally formed therewith;
molding a second turbine component, the second turbine component made separately from the first turbine component;
one of the first and second turbine components has a substantially annular mounting portion provided with a plurality of mounting holes;
mounting each of the grommets in one of the mounting holes;
non-moveably securing the first turbine component to the second turbine component;
providing a turbine hub and a plurality of fasteners; and
non-moveably securing the mounting portion of the turbine assembly to the turbine hub by the fasteners so that each of the fasteners extends through one of the grommets so as to non-moveably secure the turbine hub to the turbine assembly.

14. The method as defined in claim 13, further comprising the step of providing a torsional vibration damper, wherein the torsional vibration damper comprises:
an input member,
circumferentially acting elastic members, and
an output member elastically coupled to the input member through the elastic members; and
wherein the step of non-moveably securing the mounting portion of the turbine assembly to the turbine hub includes the step of non-moveably securing the output member of the torsional vibration damper to the turbine hub by the fasteners.

15. The method as defined in claim 13, wherein each of the grommets includes a cylindrical portion and two axially opposite annular flanges extending radially outwardly from the cylindrical portion and axially spaced apart, and wherein the steps of molding one of the first and second turbine components having the mounting portion and mounting each of the grommets to one of the mounting holes in the mounting portion includes the step of molding one of the first and second turbine components from polymeric material integrally with the grommets by molding the polymeric material over and around the cylindrical portions of the grommets so as to sandwich the mounting portion of one of the first and second turbine components between the two axially opposite annular flanges of the grommets.

* * * * *